US011638440B2

(12) United States Patent
Carrington et al.

(10) Patent No.: US 11,638,440 B2
(45) Date of Patent: May 2, 2023

(54) HEALTHFUL SUPPLEMENT FOOD

(71) Applicant: CG-Bio Genomics, Inc., Farmington, ME (US)

(72) Inventors: William C. Carrington, Las Vegas, NV (US); Marc J. George, Grand Haven, MI (US)

(73) Assignee: CG-Bio Genomics, Inc., Farmington, ME (US)

( * ) Notice: Subject to any disclaimer, the term of this patent is extended or adjusted under 35 U.S.C. 154(b) by 0 days.

(21) Appl. No.: 16/489,352

(22) PCT Filed: Feb. 28, 2018

(86) PCT No.: PCT/US2018/020237
§ 371 (c)(1),
(2) Date: Aug. 27, 2019

(87) PCT Pub. No.: WO2018/160702
PCT Pub. Date: Sep. 7, 2018

(65) Prior Publication Data
US 2020/0000136 A1   Jan. 2, 2020

Related U.S. Application Data

(60) Provisional application No. 62/464,987, filed on Feb. 28, 2017.

(51) Int. Cl.
| | | |
|---|---|---|
| A23L 33/175 | (2016.01) | |
| A23L 29/00 | (2016.01) | |
| A23L 33/12 | (2016.01) | |
| A23L 33/105 | (2016.01) | |
| A23L 33/16 | (2016.01) | |

(52) U.S. Cl.
CPC ........... *A23L 33/175* (2016.08); *A23L 29/035* (2016.08); *A23L 29/045* (2016.08); *A23L 29/05* (2016.08); *A23L 33/105* (2016.08); *A23L 33/12* (2016.08); *A23L 33/16* (2016.08)

(58) Field of Classification Search
CPC ...... A23L 33/175; A23L 29/035; A23L 33/12; A23L 29/045; A23L 29/05; A23L 33/105; A23L 33/16; A23L 33/15; A23L 33/10
USPC ........................................................ 426/601
See application file for complete search history.

(56) References Cited

U.S. PATENT DOCUMENTS

| | | | | | |
|---|---|---|---|---|---|
| 2,791,254 | A | * | 5/1957 | Crane .................... | B02B 3/02 99/610 |
| 3,682,644 | A | * | 8/1972 | Nagakura .............. | A23K 50/30 426/2 |
| 5,480,872 | A | * | 1/1996 | Cope .................... | A61K 38/011 426/641 |
| 5,576,351 | A | * | 11/1996 | Yoshimura ............ | A23L 33/175 514/565 |
| 6,106,867 | A | * | 8/2000 | Mishima ............... | A23L 3/3472 426/573 |
| 6,221,418 | B1 | * | 4/2001 | Bergenfield ............ | A21D 2/18 426/446 |
| 7,745,694 | B1 | * | 6/2010 | Knutzon ............... | C12P 7/6472 800/281 |
| 8,852,651 | B1 | * | 10/2014 | Al-Shehry ........... | A61K 36/235 424/725 |
| 2002/0172667 | A1 | * | 11/2002 | Iwasaki ................. | A61K 36/88 424/94.1 |
| 2004/0001817 | A1 | * | 1/2004 | Giampapa .............. | A61K 36/28 424/94.1 |
| 2005/0107338 | A1 | * | 5/2005 | Seidman ................ | A23L 33/10 514/78 |
| 2005/0123603 | A1 | * | 6/2005 | Dalland ................ | A61K 31/12 424/456 |
| 2006/0171958 | A1 | * | 8/2006 | Stamets ................ | A61K 36/07 424/195.15 |
| 2006/0280840 | A1 | * | 12/2006 | Robertson ............. | A23L 33/185 426/72 |
| 2008/0124286 | A1 | | 5/2008 | Lisson | |
| 2008/0124391 | A1 | * | 5/2008 | Evans .................... | A61P 37/04 424/456 |
| 2008/0226810 | A1 | * | 9/2008 | Passe ...................... | A23J 1/14 426/656 |
| 2009/0018072 | A1 | * | 1/2009 | Scheele ................. | A23L 33/17 514/7.4 |
| 2010/0041622 | A1 | | 2/2010 | Bromley et al. | |
| 2010/0216098 | A1 | * | 8/2010 | Montgomery ..... | G09B 19/0092 434/127 |
| 2013/0034530 | A1 | | 2/2013 | Fantz | |

(Continued)

FOREIGN PATENT DOCUMENTS

WO    WO-2017007833 A1    1/2017

OTHER PUBLICATIONS

NPL Anaya-Eugenio (in J Ethnopharmacology 155: 416-425, 2014). (Year: 2014).*
NPL Debnath et al. (in J Food Biochemistry 37: pp. 456-464, 2013) (Year: 2013).*
Debnath antioxidant activity . . . Gooole scholar (Retrieved oon Sep. 2021). (Year: 2021).*
Prior art web search printable history (Google scholar search history) [Retrieved on 2021]. (Year: 2021).*
NPL Hirdyani et al. (IJESR vol. 3 issue 9, pp. 32-45, 2015; https://www.researchgate.net/publication/282656557). (Year: 2015).*
International Application Serial No. PCT/US2018/020237, International Search Report dated May 14, 2018, 2 pgs.

(Continued)

*Primary Examiner* — Donald R Spamer
*Assistant Examiner* — Bhaskar Mukhopadhyay
(74) *Attorney, Agent, or Firm* — Schwegman, Lundberg & Woessner, P.A.

(57) ABSTRACT

Supplemental food formulations are described herein that can contain various nutrients, including at least four of the following: amino acid blend, fulvic-humic acids, multi-minerals, glycerin, phosphatidylinositol, sesquiterpene alkaloids, terpenes, medium-chain triglycerides (MCTs), coconut oil, whole plant matter, plant seeds, mushrooms, seaweeds, kelp, and flavoring agents.

18 Claims, No Drawings

(56) References Cited

U.S. PATENT DOCUMENTS

| | | | | |
|---|---|---|---|---|
| 2014/0023721 | A1* | 1/2014 | Amelotti | A61K 36/28 424/537 |
| 2014/0087049 | A1* | 3/2014 | Ankolekar | A23L 27/30 426/548 |
| 2014/0105928 | A1 | 4/2014 | Stamets | |
| 2014/0140986 | A1* | 5/2014 | Santos | C07K 16/18 424/130.1 |
| 2014/0271940 | A1* | 9/2014 | Wurzer | A61P 25/00 424/725 |
| 2014/0302560 | A1* | 10/2014 | Kelly | A23L 21/25 435/71.1 |
| 2014/0348883 | A1* | 11/2014 | Reynolds | A23L 33/175 424/400 |
| 2015/0071884 | A1* | 3/2015 | Lameire | A61K 36/00 424/93.4 |
| 2015/0079235 | A1* | 3/2015 | Wright | B01D 11/0288 426/61 |
| 2015/0283072 | A1* | 10/2015 | Popitz | A61K 36/66 424/736 |
| 2016/0022655 | A1 | 1/2016 | Veenstra et al. | |
| 2016/0038552 | A1 | 2/2016 | Bredesen et al. | |
| 2016/0227808 | A1* | 8/2016 | Hofstra | A61P 19/10 |
| 2016/0353786 | A1* | 12/2016 | McHugh | A61K 36/55 |

OTHER PUBLICATIONS

International Application Serial No. PCT/US2018/020237, Written Opinion dated May 14, 2018, 5 pgs.
"Adult Multi-plus Multi-Vitamins Minerals Purecaps", MINTEL, Database accession No. 2026231, (Mar. 2013), 6 pgs.
Canadian Application Serial No. 3,054,478, Office Action dated Jan. 20, 2021, 10 pgs.
Canadian Application Serial No. 3,054,478, Response filed May 19, 2021 to Office Action dated Jan. 20, 2021, 24 pgs.
European Application Serial No. 18761863.2, Extended European Search Report dated Oct. 23, 2020, 9 pgs.
"High protein bar extensions", MINTEL; Database accession No. 10179534, 3 pgs.
International Application Serial No. PCT/US2018/020237, International Preliminary Report on Patentability dated Sep. 12, 2019, 7 pgs.
"Reishi Shiitake Maitake Mushroom Extract Vegetable Capsules—Solgar Vitamins, Minerals, and Herbs", Solgar Inc., [Online] Retrieved from the internet on May 13, 2019: <http://www.solgar.com/solgarproducts/reishi-shiitake-maitake-mushroom-extract-vegetable-capsules.htm>, (May 12, 2015), 1 pg.
"Soymilk Smoothie", MINTEL, Database accession No. 3292183. (Jun. 2015), 3 pgs.
Aikaterini, Triantafyllidi, et al., "Herbal and plant therapy in patients with inflammatory bowel disease", Annals of Gastroenterology 28, (2015), 210-220.
"Canadian Application Serial No. 3,054,478, Office Action dated Aug. 24, 2021", 6 pgs.
Canadian Application Serial No. 3,054,478, Response filed Dec. 23, 2021 to Office Action dated Aug. 24, 2021, 16 pgs.
Canadian Application Serial No. 3,054,478, Non Final Office Action dated Mar. 30, 2022, 5 pgs.
Ku, et al., "Health Benefits of Blue-Green Algae: Prevention of Cardiovascular Disease and Nonalcoholic Fatty Liver Disease", Journal of Medicinal Food, 16(2), (Feb. 2013), 103-111.
Tang, et al., "Vitamin A, nutrition, and health values of algae: Spirulina, Chlorella, and Dunaliella", Journal of Pharmacy and Nutrition Sciences, 1(2), (Jan. 5, 2011).
"Canadian Application Serial No. 3,054,478, Examiners Rule 86(2) Requisition dated Jan. 11, 2023", 6 pgs.
Boye, "Pulse proteins: Processing, characterization, functional properties and applications in food and feed", Food Research International, 43(2), (Sep. 11, 2009), 414-431.

* cited by examiner

HEALTHFUL SUPPLEMENT FOOD

CROSS REFERENCE TO RELATED APPLICATIONS

This application is a U.S. National Stage Filing under 35 U.S.C. 371 from International Application No. PCT/US2018/020237, filed on Feb. 28, 2018, and published as WO 2018/160702 A1 on Sep. 7, 2018, which claims the benefit of priority to U.S. Provisional Patent Application Ser. No. 62/464,987 entitled "Healthful Supplement Food," filed Feb. 28, 2017, the complete disclosure of each of which is incorporated herein by reference in its entirety.

BACKGROUND

Many nutritional supplements and 'superfoods' are currently available. However, most currently available nutritional supplements fail to provide optimal health benefits. Moreover, currently available nutritional supplements are often developed for mass marketing and consumption. As a result, these nutritional supplements are manufactured to maximize convenience for the manufacturer and quality is often sacrificed. Mass produced nutritional supplements often include undesirable ingredients such as preservatives, chemicals and heavy metals rather than clean, safe and non-toxic ingredients.

SUMMARY

Clean, safe, and non-toxic dietary nutritional supplement food that provide optimal health benefits are described herein. Dietary nutritional supplement foods, such as those described herein, are believed to be particularly useful as health supplements.

The supplement foods described herein have no negative side effects and can optimize health of animals, including humans, who receive them. The supplemental food contains a number of nutrients including at least four of the following: amino acid blend, Fulvic-humic acids, multi-minerals, glycerin, phosphatidylinositol, sesquiterpene alkaloids, terpenes, medium-chain triglycerides (MCTs), coconut oil, whole plant matter, plant seeds, mushrooms, seaweeds, kelp, and flavoring agents. In some cases, the supplement food(s) can include one or more freshness preservation compound(s). The supplement food formulation can be in the form of a powder, liquid, suspension, gel, health bar (e.g. chewy, crispy, or soft), or other form of food.

DETAILED DESCRIPTION

The supplement food can include at least four of the following components: amino acid blend, Fulvic-humic acids, multi-minerals, glycerin, phosphatidylinositol, sesquiterpene alkaloids, terpenes, medium-chain triglycerides (MCTs), coconut oil, whole plant matter, plant seeds, mushrooms, seaweeds, kelp, and flavoring agents. In some cases, the supplement food can include at least five, or at least of six, or at least seven, or at least eight, or at least nine, or at least ten, or at least eleven, or at least twelve, or all of the foregoing listed components. The supplement food(s) can also optionally include one or more freshness preservation compound(s).

The supplement foods have surprising benefits, such as reducing the incidence and/or severity of disease relative to an animal (or human) who does not receive the supplements. Humans and animals that receive the supplements can exhibit resistance to disease and improved immune responses. Humans and animals that receive the supplements can have reduced pain, disease improvement, more energy, improved sleep patterns, increased activity levels, reduced extremity numbness, improved digestion, fewer headaches, reduced symptoms, fewer tumors, fewer cancer cells, and/or fewer seizures, compared to their own experience prior to taking the supplements.

The supplement foods can be administered to animals, including humans, domesticated animals (e.g., dogs, cats, horses, cattle, pigs, goats, poultry, sheep, alpacas, llamas, and the like), zoo animals, experimental animals (e.g., mice, rats, guinea pigs and the like), and wild animals.

Amino Acid Blend

The amino acid blend can include any of the genetically encoded amino acids, as well as non-genetically encoded amino acids. Examples of amino acids that can be included in the supplement food formulations are as shown in Table 1.

TABLE 1

| Amino Acid | One-Letter Symbol | Common Abbreviation |
|---|---|---|
| Alanine | A | Ala |
| Arginine | R | Arg |
| Asparagine | N | Asn |
| Aspartic acid | D | Asp |
| Cysteine | C | Cys |
| Glutamine | Q | Gln |
| Glutamic acid | E | Glu |
| Glycine | G | Gly |
| Histidine | H | His |
| Isoleucine | I | Ile |
| Leucine | L | Leu |
| Lysine | K | Lys |
| Methionine | M | Met |
| Phenylalanine | F | Phe |
| Proline | P | Pro |
| Serine | S | Ser |
| Threonine | T | Thr |
| Tryptophan | W | Trp |
| Tyrosine | Y | Tyr |
| Valine | V | Val |
| β-Alanine | | bAla |
| 2,3-Diaminopropionic acid | | Dpr |
| α-Aminoisobutyric acid | | Aib |
| N-Methylglycine (sarcosine) | | MeGly |
| Ornithine | | Orn |
| Citrulline | | Cit |
| t-Butylalanine | | t-BuA |
| t-Butylglycine | | t-BuG |
| N-methylisoleucine | | MeIle |
| Phenylglycine | | Phg |
| Cyclohexylalanine | | Cha |
| Norleucine | | Nle |
| Naphthylalanine | | Nal |
| Pyridylalanine | | |
| 3-Benzothienyl alanine | | |
| 4-Chlorophenylalanine | | Phe(4-Cl) |
| 2-Fluorophenylalanine | | Phe(2-F) |
| 3-Fluorophenylalanine | | Phe(3-F) |
| 4-Fluorophenylalanine | | Phe(4-F) |
| Penicillamine | | Pen |
| 1,2,3,4-Tetrahydro-isoquinoline-3-carboxylic acid | | Tic |
| β-2-thienylalanine | | Thi |
| Methionine sulfoxide | | MSO |
| Homoarginine | | hArg |
| N-acetyl lysine | | AcLys |
| 2,4-Diamino butyric acid | | Dbu |
| β-Aminophenylalanine | | Phe(pNH$_2$) |
| N-methylvaline | | MeVal |
| Homocysteine | | hCys |
| Homoserine | | hSer |

TABLE 1-continued

| Amino Acid | One-Letter Symbol | Common Abbreviation |
|---|---|---|
| Amino hexanoic acid | | Aha |
| Amino valeric acid | | Ava |
| 2,3-Diaminobutyric acid | | Dab |

In some cases, the amino acid blend includes genetically encoded amino acids such as at least five, or at least six, or at least seven, or at least eight, or at least nine, or at least ten, or at least eleven, or at least twelve, or at least thirteen, or at least fourteen, or at least fifteen, or at least sixteen, or at least seventeen, or at least eighteen, of the following: alanine, arginine, aspartic acid, cysteine, cystine, glutamic acid, glycine, histidine, isoleucine, lysine, leucine, methionine, phenylalanine, serine, proline, threonine, tryptophan, tyrosine, and/or valine.

For a single serving, the amount of each component of the amino acid blend can range from about 1 µg/Kg to about 15 mg/Kg, or from about 0.5 mg/Kg to about 12 mg/Kg, or from about 1 mg/Kg to about 10 mg/Kg of the animal, or any intervening amount thereof.

Fulvic Acid/Humic Acid

The supplement foods described herein can include fulvic and/or humic acids. Humic acid is a component of humic substances, which are the major organic constituents of soil (humus), peat, and coal; humus can also be found in some upland streams, dystrophic lakes, and ocean water. Humic acid is produced by biodegradation of dead organic matter. It is not a single acid. Instead, it is a complex mixture of many different acids containing carboxyl and phenolate groups so that the mixture behaves functionally as a dibasic acid or, occasionally, as a tribasic acid. Humic acids can form complexes with ions that are commonly found in the environment creating humic colloids. Fulvic acids are humic acids of lower molecular weight and higher oxygen content than other humic acids.

Humic substances in soils and sediments can be divided into three main fractions: humic acids, fulvic acids, and humin. The humic and fulvic acids can be extracted as a colloidal sol from soil and other solid phase sources using basic aqueous solutions of sodium hydroxide or potassium hydroxide. Humin is insoluble in dilute alkali and is therefore not collected by basic extraction. Humic acids are precipitated from basic solutions by adjusting the pH to 1 with hydrochloric acid, leaving the fulvic acids in solution. This solubility difference at acidic pH is the operational distinction between humic and fulvic acids.

Humic and fulvic acids are commonly used as a soil supplement in agriculture, and less commonly as a human nutritional supplement. As a nutrition supplement, fulvic acid can be found in a liquid form as a component of mineral colloids. Fulvic acids are poly-electrolytes and are unique colloids that diffuse easily through membranes whereas all other colloids do not.

Humic and fulvic acids can react with the chemicals used in the chlorination process, which is sometimes used for generating drinking water, to form disinfection byproducts such as dihaloacetonitriles, which are toxic to humans. Although water is generally not used for preparing humic and fulvic acids or the supplements described herein, if water is used to prepare or formulate humic and fulvic acids, a pure source of water (without chlorine or chlorination byproducts) is used.

Humic and fulvic acids are available commercially and can be obtained, for example, from SupremeFulvic (see website at SupremeFulvic.com). A convenient source of the fulvic-humic acids and the minerals used in the supplements described herein is Vital Earth—Fulvic Mineral Complex Ionic Mineral Supplement (see, e.g., website at vitacost.com/vital-earth-minerals-fulvic-mineral-complex?csrc=GPF-PA-Vitamins %20%26%20Supplements-855748000016&ci_gpa=pla&ci_kw=&ci_src=17588969&ci_sku=855748000016& CGlid=CM6DquuutcYCFdgLgQodpKOMFQ).

The amount of humic/fulvic acids that are present in a single serving of the supplement food can range from about 1 mg/Kg to about 50 mg/Kg, or from about 5 mg/Kg to about 40 mg/Kg, or from about 10 mg/Kg to about 30 mg/Kg of the animal, or any intervening amount thereof. In some cases, a serving of the humic/fulvic acid content can be about 20 mg/Kg of the animal. For example, one serving of Vital Earth—Fulvic Mineral Complex Ionic Mineral Supplement can be about 0.5 to about 2 fluid ounces. The humic/fulvic acids can be an optional ingredient.

Multi-Minerals

The supplement foods described herein can include small amounts of minerals or salts thereof. Examples of such minerals can include antimony, barium, beryllium, bismuth, boron, bromine, cadmium, calcium, cerium, cesium, chloride, chromium, cobalt, copper, dysprosium, erbium, europium, fluorine, gadolinium, gallium, germanium, gold, hafnium, holmium, indium, iodine, iridium, iron, lanthanum, lithium, lutetium, magnesium, manganese, molybdenum, neodymium, nickel, niobium, osmium, palladium, phosphorous, platinum, potassium, praseodymium, rhenium, rhodium, rubidium, ruthenium, samarium, scandium, selenium, silicon, silver, sodium, strontium, sulfur, tantalum, tellurium, terbium, thulium, thorium, tin, titanium, tungsten, vanadium, ytterbium, yttrium, zinc, zirconium, or any combination thereof.

The minerals of the listed elements can be used as salts. For example, the listed elements can be employed as their customary cations and/or anions in combination with corresponding gegenions. For cations, the halogen, sulfate, nitrate, and phosphate salts are typically employed. For anions such as oxygenated forms of transition metals and non-metallic elements (Groups III-VII of the Periodic Chart), alkaline and alkaline earth metal salts are typically employed.

The amounts of minerals in the supplement food can vary. For example, the minerals in a single serving of the supplement food can range from about 0.01 µg/Kg to about 100 mg/Kg, or from about 0.1 µg/Kg to about 50 µm/Kg, or from about 1 µg/Kg to about 40 mg/Kg, or from about 1 mg/Kg to about 40 µg/Kg, or from about 2 mg/Kg to about 30 µg/Kg, or from about 5 mg/Kg to about 30 µg/Kg of the animal, or any intervening amount thereof.

Glycerin

The supplement foods described herein can include glycerin. In some cases, the glycerin can be a vegetable glycerin, or glycerol. Glycerin or glycerol is a clear, odorless liquid typically produced from plant oils. For example, the vegetable glycerin can be obtained from palm oil, soy oil, coconut oil, or a combination thereof. It has a flash point of approximately 177° C., and a boiling point of 290° C. (554° F.). Accordingly, it can be subjected to processing at room temperature and at the temperatures described herein for manufacturing the supplemental food. Vegetable glycerin is relatively nontoxic. The MSDS indicates that the $LD_{50}$ oral rat dosage is 12,600 milligrams per kilogram of body weight, which is approximately 5.7 grams per pound of body weight, or 36 ounces for a 180 pound male. By comparison, acute oral toxicity ($LD_{50}$) in rats for sucrose (table sugar) is 29700 mg/kg and the acute oral toxicity ($LD_{50}$) in rats for ethyl (grain) alcohol is about 7060 mg/kg.

Vegetable glycerin can be obtained from a variety of sources such as from Bulk Apothecary (see website at bulkapothecary.com/raw-ingredients/other-ingredients-and-chemicals/glycerin/?gclid=Clabgs_2pcYCFUI8gQodcmYNHw) or from Sigma-Aldrich (see website at sigmaaldrich.com/catalog/search?term=Glycerine&interface=All&N=0&mode=partialmax&lang=en&region=US &focus=product).

The amount of glycerin that are present in a single serving of the supplement food can range, for example, from about 0.1 mg/Kg to about 100 mg/Kg, or from about 1 mg/Kg to about 80 mg/Kg, or from about 2 mg/Kg to about 60 mg/Kg of the animal, or any intervening amount thereof. In some cases, the glycerin content can be about 45 mg/Kg per serving.

Phosphatidylinositol

The supplement foods described herein can include one or more types of phosphatidylinositol. Phosphatidylinositol is a family of lipids that include a phosphoinositol sugar. The phosphate can be on the 3-position, the 4-position, or the 5-position of the inositol. In some cases, the inositol can have two phosphate residues on the 3-position, the 4-position, and/or the 5-position. Phosphatidylinositol can be obtained from Sigma-Aldrich.

The amount of phosphatidylinositol that are present in a single serving of the supplement food can range, for example, from about 0.1 mg/Kg to about 10 mg/Kg, or from about 0.2 mg/Kg to about 5 mg/Kg, or from about 0.3 mg/Kg to about 2 mg/Kg of the animal, or any intervening amount therein.

Terpenes/Sesquiterpene Alkaloids

The supplement foods described herein can include one or more terpenes, as well as one or more sesquiterpene alkaloid compounds. For example, the supplement foods described herein can include a variety of terpenes such as alpha-humulene, alpha-phellandrene, alpha-pinene, alpha-terpinene, alpha-terpinolene, beta-myrcene, beta-pinene, camphene, cis-ocimene, delta-3 carene, limonene, or combinations thereof.

Sesquiterpene alkaloid compounds include sesquiterpenes that have a basic nitrogen. One example is huperzine A, with the following structure.

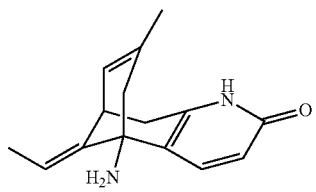 [SMILES: C/C=C1\C2C=C(C)CC1(N)c1ccc(=O)[nH]c1C2]

Huperzine A ("huperzine") is an alkaloid derived from the club moss *Huperzia serrata*. Huperzine has been used in Chinese medicine to treat inflammation and fever. One source for Huperzine A is Sigma (H5777). Recently, huperzine was found to improve cognitive function, mental alertness, focus, concentration, and memory. The beneficial effects of huperzine supplementation may be linked to its ability to enhance or improve cholinergic transmission and by naturally decreasing acetylcholine hydrolysis through acetylcholinesterase inhibition and by increasing neuronal cell survival and decreasing neuronal cell death.

Amounts of terpenes, sesquiterpene alkaloid compounds, and huperzine A used within supplement foods can vary. For example, single servings of each terpene, sesquiterpene alkaloid compound, or huperzine A can be about 0.01 µg/Kg to about 200 mg/Kg, about 0.05 µg/Kg to about 100 mg/Kg, or about 0.1 µg/Kg to about 50 mg/Kg, or any intervening range therein. In some cases, a supplement food can include about 0.01 µg/Kg, about 0.03 µg/Kg, about 0.05 µg/Kg, about 0.07 µg/Kg, about 0.1 µg/Kg, 2 µg/Kg, 5 µg/Kg, about 10 µg/Kg, about 50 µg/Kg, about 100 µg/Kg, about 0.5 mg/Kg, about 1 mg/Kg, about 5 mg/Kg, about 10 mg/Kg, or about 30 mg/Kg of the animal, or any intervening amount therein.

Medium-Chain Triglycerides (MCTs)

The supplement foods described herein can include medium-chain triglycerides (MCTs). One example of a MCT that can be included is caprylic acid. Caprylic acid has antibacterial, antiviral and antifungal properties and it can help treat health problems associated with the overgrowth of yeast, such as vaginal yeast infections, *Candida*, and thrush. Caprylic acid can also be used to treat fungal infections, such as ringworm.

The amounts of caprylic acid in the supplement food can vary. For example, a single dose of caprylic acid in the supplement food can be about 0.1 mg/Kg to about 100 mg/Kg, or from about 1.0 mg/Kg to about 80 mg/Kg, or from about 20 mg/Kg to about 60 mg/Kg, or any intervening amount therein. In some cases, a single dose of caprylic acid in the supplement food can be about 1,000 to 3,000 milligrams per day. One source for caprylic acid is Sigma-Aldrich-PHR1202.

The caprylic acid can be included in the supplement food formulations with a mixture of MCTs and/or in coconut oil.

MCTs include glycerol moieties substituted with $C_6$, $C_8$, $C_{10}$ and/or $C_{12}$ mixtures of fatty acids. The percentages of triglycerides with $C_6$, $C_8$, $C_{10}$ and/or $C_{12}$ fatty acids in the MCT mixture can, for example, include 30% to 100% of the total triglycerides, or 50% to 100%, 50% to 95%, and 60% to 95% of the triglycerides. The proportion of $C_6$ fatty acids in the MCT mixture can, for example, be about 0% to 3%, or about 2%. The proportion of $C_8$ fatty acids in the MCT mixture can, for example, be about 50% to 100%, or about 65-80%. The proportion of $C_{10}$ fatty acids in the MCT mixture can, for example, be about 15% to 60%, or about 20-35%. The proportion of $C_{12}$ fatty acids in the MCT mixture can, for example, be about 0% to 3%, or about 2%. The MCT compositions can contain varying amounts of free fatty acids. For example, the MCT compositions can amounts of free fatty acids of up to about 0.005/mEq/g (USP), for example. In some cases, the MCTs can have a saponification value of about from 325-365 (USP) and an iodine value (USP Method II) of up to about 1.0 $gI_2$/100 g. These specifications are not critical. MCT oils of this type are commercially available as lauric oils from coconut oil.

In some cases, most of the fatty acids are $C_8$ and $C_{10}$ fatty acids, for example in ratios of about from 1:3 to 3:1. The exact specifications, including the relative proportions of $C_6$ to Cu medium chain fatty acids, will vary somewhat since the MCTs are obtained from natural sources.

Single servings of MCTs can include about 0.01 mg/Kg to about 500 mg/Kg, about 0.05 mg/Kg to about 300 mg/Kg, or about 0.1 mg/Kg to about 200 mg/Kg of the animal, or any intervening range therein.

Coconut Oil

The supplement foods described herein can include coconut oil. Coconut oil can provide several benefits, including stimulation of the brain's capacity to learn and categorize information, improved weight loss, increased energy, and reduced incidence of depression, Alzheimer's, anxiety, and dementia.

A single serving of coconut oil can range from about 1.0 mg/Kg to about 100 mg/Kg, or from about 5 mg/Kg to about 80 mg/Kg, or from about 10 mg/Kg to about 60 mg/Kg of the animal, or any intervening range therein.

Whole Plant Matter

The supplement foods described herein can include whole plant materials. For example, liquid, dried, or powdered whole plant materials from plants such as *Astragalus*, fenugreek, monk fruit, and combinations thereof.

Whole *Astragalus* plant materials from species such as *Astragalus propinquus* (syn. *Astragalus membranaceus*, also known as huáng qì, běi qí, or huáng huā huáng qí) can be included in the supplement food formulations. *Astragalus propinquus* is a perennial, flowering plant in the family Fabaceae. It is one of about 50 fundamental herbs used in traditional Chinese medicine.

The whole plant or parts of the plant, such as the roots, can be used as a component of the supplements described herein. One method of preparing useful components of *Astragalus membranaceus* involves extraction of the roots with 95% ethanol. For example, 10 kg of the roots of *Astragalus membranaceus* can be extracted with 100 liters of 95% ethanol under reflux for 4 hours. The alcoholic solution can be discarded and the vegetal material can be extracted with 100 liters of 20% aqueous ethanol. The hydroalcoholic extract solution can be concentrated under vacuum to a 10 liters volume at a temperature of 50° C. The aqueous solution can be decolorized at 50° C. with 100 g of activated vegetal charcoal. The solution can then be diluted under continuous agitation with 40 liters of 95% ethanol. The resulting precipitate can be collected by decanting off the supernatant. The supernatant is discarded and the precipitate is set aside.

The solid vegetal material obtained by extraction with 20% ethanol, as described above, can be treated with 50 liters 1N NaOH and left to stand at 14° C. for 12 hours. The solution and the vegetal material can then be neutralized at pH 7 and heated to the boiling point for 2 hours. The vegetal material can be filtered at a temperature of about 70° C. and the extracted liquid can be decolorized with 100 g of activated vegetal charcoal. The extracted liquid can then be concentrated to about 8 liters. After filtering to remove the flocculated material, the concentrate can be decanted into 10 liters of 95% ethanol. The resulting solid precipitate can be collected and added to the material obtained above from the neutral hydroalcoholic extraction.

The pooled solid materials can be dissolved in 5 liters of water and the resulting solution can be poured under vigorous shaking into 20 liters of isopropanol. After drying under vacuum overnight, 420 g of the final product can be obtained, which consists of a polysaccharide mixture containing substances with molecular weights ranging from 12,000 to 500,000 daltons.

A single serving of *Astragalus membranaceus* plant materials in the in the supplement food formulations can vary. For example, the amount of *Astragalus membranaceus* plant materials can range from about 1 mg/Kg to about 30 mg/Kg, or from about 3 mg/Kg to about 25 mg/Kg, or from about 5 mg/Kg to about 20 mg/Kg of the animal, or any intervening range therein. In some cases, the amount of *Astragalus membranaceus* extract can be about 14 mg/Kg per serving.

Whole fenugreek plant materials can also be included in the supplement food formulations. Fenugreek is an annual plant in the family Fabaceae, with leaves consisting of three small obovate to oblong leaflets. It is cultivated worldwide as a semiarid crop, and its seeds are a common ingredient in dishes from the Indian Subcontinent in South Asia. The whole plant or parts of the plant, such as the seeds, can be used as a component of the supplements described herein.

For example, the seeds and/or other plant parts can be powdered using pestle and mortar. The powdered plant materials can be incorporated into the supplement foods. Alternatively, about 100 g of fenugreek powdered plant/seed material can be extracted with hexane to remove lipophilic compounds using a Soxhlet apparatus. To remove pigments and to deactivate enzymes, the defatted powder can be boiled in ethanol for 20 min. This treated powder can then be soaked in 10 liters of water and the pH can be adjusted to 3.5 using 0.5 M hydrochloric acid. The mixture can be stirred by a mechanical stirrer for 12 h and then filtered through filtration paper. The filtrate can be centrifuged (5000 g) and the supernatant concentrated in vacuum to 50% of its initial volume. The resulting supernatant solution can be mixed with the same volume of 96% ethanol and stored in a refrigerator for 4 h. The precipitated mucilage can then be sedimented by centrifugation (5000 g). The collected mucilage can be re-suspended in distilled water, agitated for 20 min and re-precipitated one more time to eliminate chloride ions and other impurities. Finally, the residue can be washed with diethyl ether and acetone and dried overnight at 45° C., resulting in an off-white powder.

A serving size of fenugreek plant materials in the in the supplement food formulation can vary. For example, the amount of fenugreek plant materials can range from about 0.1 mg/Kg to about 100 mg/Kg, or from about 0.5 mg/Kg to about 75 mg/Kg, or from about 1 mg/Kg to about 60 mg/Kg of the animal, or any intervening range therein. In many cases, the amount of fenugreek plant materials can be about 5.5 mg/Kg per serving or about 50 mg/Kg.

Monk fruit (*Siraitia grosvenorii*) is a small sub-tropical melon that is often cultivated in Asia. Monk fruit is one of the sweetest fruits around. It is even sweeter than cane sugar but the sweetness in monk fruit has no calories. The sweet taste of monk fruit comes mainly from mogrosides, a group of triterpeneglycosides that make up about 1% of the flesh of the fresh fruit. Monk fruit is generally recognized as safe by the FDA, and there are no restrictions on consuming the fruit or its extracts.

A single serving of monk fruit is about 0.1 grams to 40 grams, or about 0.2 to 30 grams, or about 0.3 to 20 grams, or about 0.5 to 20 grams, or any intervening range therein.

Plant Seeds

The supplement food formulations described herein can include seeds. In some cases, the seeds can be in the form of a powder or a liquid extract of plant seeds, such as black seeds, chia seeds, flax seeds, raw pepita seeds, Goji berries, and combinations thereof.

Black seeds are small, black, thick shaped seeds from the *Nigella sativa* flower. The seeds have a harsh taste and can burn the stomach if the seeds are not heated first. Black seeds can be heated at low heat with stirring until their taste becomes bland, and then ground into a powder. A single serving of black seeds is about 0.1 grams to 40 grams, or about 1 to 30 grams, or about 2 to 20 grams, or about 2 to 10 grams, or any intervening range therein.

Chia is *Salvia hispanica*, which is a species of flowering plant in the mint family that is native to central and southern Mexico and Guatemala. A single serving of chia seeds is about 0.1 grams to 50 grams, or about 1 to 40 grams, or about 5 to 35 grams, or about 10 to 35 grams, or about 15 to 25 grams, or any intervening range therein.

Flax is *Linum usitatissimum*, which is a food and fiber crop cultivated in cooler regions of the world. A single serving of flaxseeds is about 1 grams to 100 grams, or about 3 to 75 grams, or about 5 to 60 grams, or about 10 to 50 grams, or about 20 to 45 grams, or any intervening range therein.

Raw pepita seeds are raw pumpkin seeds. A single serving of pepita seeds is about 1 grams to 150 grams, or about 5 to 100 grams, or about 10 to 75 grams, or about 15 to 50 grams, or about 20 to 45 grams, or any intervening range therein.

Goji berry or wolfberry is the fruit of either the *Lycium barbarum* or *Lycium chinense*, two closely related species of boxthorn in the nightshade family. A single serving of dried Goji berries is about 1 grams to 500 grams, or about 5 to 300 grams, or about 10 to 250 grams, or about 20 to 200 grams, or about 30 to 150 grams, or any intervening range therein.

Mushrooms

The supplement foods described herein can include mushrooms. The supplement foods described herein can include whole mushrooms or parts of mushrooms, such as the caps. For example, whole mushrooms (or parts thereof), can be processed for inclusion in the supplement foods described herein. The mushrooms in the mushroom extract can include Brazillian Blazei (*Agaricus blazei*), Caterpillar Mushroom (*Cordyceps sinensis*), Agarikon (*Fomitopsis officinalis*), Turkey Tail (*Coriolus versicolor*), Enoki (*Flammulina velutipes*), reishi (*Ganoderma lucidum*), Artist Conk (*Ganoderma applanatum*), Maitake (*Grifola frondosa*), Lion's Mane (*Hericium erinaceus*), Chaga (*Inonotus obliquus*), Shiitake (*Lentinula edodes*), Birch Polypore (*Piptoporus betulinus*), Mesimakobu (*Phellinus linteus*), Zhuling (*Polyporus umbellatus*), Fuling (*Poria cocos*), or a combination thereof.

In some cases, each serving of the supplement foods described herein can include about 25 to 500 mg of each type of mushroom, or about 40 to 400 mg of each type of mushroom, or about 30 to 350 mg of each type of mushroom, or any intervening range therein. However, larger or smaller amounts of the various mushrooms can also be included.

Brazillian Blazei (*Agaricus blazei*) is also known as ABM or Royal Sun *Agaricus*. It was originally found in Brazil in a region where the people are known to live longer and healthier lives than the average. A single serving of *Agaricus blazei* is about 0.1 grams to 40 grams, or about 0.5 to 25 grams, or about 1 to 15 grams, or about 1.5 to 10 grams, or about 1.5 to 7 grams, or any intervening range therein.

Caterpillar Mushroom (*Cordyceps sinensis*, renamed *Ophiocordyceps sinensis*). A single serving of *Ophiocordyceps sinensis* is about 0.01 grams to 20 grams, or about 0.05 to 15 grams, or about 0.1 to 10 grams, or about 0.5 to 5 grams, or about 1 to 3 grams, or any intervening range therein.

Agarikon (*Fomitopsis officinalis*, also known as *Laricifomes officinalis*) is a hefty, bracket fungus and can be found on the trunks of coniferous hosts, where it causes a brown-rot. The fruiting bodies persist for many years, becoming longer and longer as they grow. This species occurs worldwide, and has gone by several common names including Agarikon, Quinine Conk, Larch Bracket Mushroom, Brown Trunk Rot and Eburiko. A single serving Agarikon (*Fomitopsis officinalis*) is about 0.1-20 gm/day, or about 0.25-10 gm/day, or about 0.5-5 gm/day, or any intervening range therein.

Turkey Tail (*Coriolus versicolor*, also known as *Trametes versicolor*) is a common polypore mushroom found throughout the world. A single serving of *Coriolus versicolor* is about 0.01 grams to 20 grams, or about 0.5 to 15 grams, or about 1 to 12 grams, or about 3 to 10 grams, or about 5 to 10 grams, or any intervening range therein.

Enoki (*Flammulina velutipes*) naturally grows on the stumps of the Chinese Hackberry tree (*Celtis sinensis*, "enoki" in Japanese), but also on other trees, such as ash, mulberry and persimmon trees. A single serving of *Coriolus versicolor* is about 0.1 grams to 200 grams, or about 0.5 to 150 grams, or about 1 to 100 grams, or about 1 to 50 grams, or about 2 to 10 grams, or any intervening range therein.

Reishi (*Ganoderma lucidum*) is a purplish-brown fungus with a long stalk, brown spores, and a fan-shaped cap with a shiny, varnish-coated appearance. Reishi grows on decaying wood or tree stumps, preferring the Japanese plum tree but also found on oak. The mushroom is native to China, Japan, and North America but is cultivated throughout other Asian countries. Cultivation of reishi can be a long and complicated process. Reishi grows in six colors, each thought to have different characteristics and known as: Aoshiba (blue reishi), Akashiba (red reishi), Kishiba (yellow reishi), Shiroshiba (white reishi), Kuroshiba (black reishi), and Murasakishiba (purple reishi). In some cases, the reishi in the supplement foods is red reishi. The amount of reishi (*Ganoderma lucidum*) in the in the supplement foods can vary. For example, a single daily serving of reishi (*Ganoderma lucidum*) can range from about 0.5 to 100 grams, or about 1 to 50 grams, or about 2 to 20 grams, or about 3 to 10 grams, or any intervening range therein.

Artist Conk (*Ganoderma applanatum*) is common in Maine, growing on older sugar maples and many other hardwood trees usually persisting for years. When they are picked the interior reveals layers of pores that are like rings on a tree in describing age. Artist Conk (*Ganoderma applanatum*) contains polysaccharides and triterpenoids that have various medicinal implications. They can be made into a medicinal tea by drying the mushrooms thoroughly and grinding them with a meat grinder or other type of grinder. The powder can be extracted with water, and the extract can be dried. The amount of Artist Conk (*Ganoderma applanatum*) in the in the supplement foods can vary. For example, a single daily serving of Artist Conk (*Ganoderma applanatum*) can range from about 0.5 to 100 grams, or about 1 to 50 grams, or about 2 to 20 grams, or about 3 to 10 grams, or any intervening range therein.

Maitake (*Grifola frondosa*) is a polypore mushroom that grows in clusters at the base of trees, particularly oaks. The mushroom is commonly known among English speakers as hen of the woods, hen-of-the-woods, ram's head and sheep's head. It is typically found in late summer to early autumn. A single serving of Maitake (*Grifola frondosa*) is about 0.01 grams to 20 grams, or about 0.05 to 15 grams, or about 0.1 to 10 grams, or about 0.3 to 7 grams, or about 0.4 to 5 grams, or any intervening range therein.

*Hericium erinaceus* (also called lion's mane mushroom, bearded tooth mushroom, satyr's beard, bearded hedgehog mushroom, pompom mushroom, or bearded tooth fungus) is an edible and medicinal mushroom belonging to the tooth fungus group. Native to North America, Europe and Asia it can be identified by its long spines (greater than 1 cm length), its appearance on hardwoods and its tendency to grow a single clump of dangling spines, or any intervening range therein. It is typically found in late summer to early autumn. A single serving of Maitake (*Grifola frondosa*) is about 0.01 grams to 20 grams, or about 0.05 to 15 grams, or about 0.1 to 10 grams, or about 0.3 to 7 grams, or about 0.4 to 5 grams, or any intervening range therein.

*Inonotus obliquus*, commonly known as chaga mushroom, is a fungus in the family Hymenochaetaceae. It is parasitic on birch and other trees. The sterile conk is irregularly formed and has the appearance of burnt charcoal. A single serving of chaga (*Inonotus obliquus*) is about 0.01 grams to 20 grams, or about 0.05 to 15 grams, or about 0.1 to 10 grams, or about 0.3 to 7 grams, or about 0.3 to 5 grams, or any intervening range therein.

Shiitake (*Lentinula edodes*) is an edible medicinal mushroom, well known in the East. This mushroom is widespread in Japan and China, where is part of the common alimentation. A single serving of shiitake (*Lentinula edodes*) is about 0.1 grams to 30 grams, or about 0.5 to 20 grams, or about 1 to 15 grams, or about 2 to 12 grams, or about 4 to 11 grams, or any intervening range therein.

Birch polypore (*Piptoporus betulinus*) grows from a single lateral attachment point on birch trees, being subglobose at first, then expanding to a bracket measuring approximately 10-20 cm across. It is white to begin with, the cap changing to a beige/tan color and then darkening or greying with age. The underside is white and contains many pores which release their spores into the air. Spores land on exposed areas of birch trees, where branches have broken for example, and begin to grow hyphae which spread to form a mycelial network through the tree. It may be weakly parasitic on birch trees. A healthy tree will be able to contain the spreading hyphae but in one that is aged or diseased the fungus will begin the gradual process of breaking it down. The fruiting bodies are annual, unlike some of our other common bracket fungi which may live for years, but they are often gnawed by insects before the end of this period so they are better picked young. A single serving of Birch Polypore (*Piptoporus betulinus*) is about 0.1 grams to 30 grams, or about 0.5 to 20 grams, or about 1 to 15 grams, or about 2 to 12 grams, or about 4 to 11 grams, or any intervening range therein.

Mesimakobu (*Phellinus linteus*) (Chinese "song gen" or Korean "sanghwang" or English "Meshima" or American English "black hoof mushroom") is shaped like a hoof, has a bitter taste, and in the wild grows on mulberry trees. The stem's color ranges from dark brown to black. In Korean traditional medicine, the mushroom is consumed in the form of hot tea. A single serving of Mesimakobu (*Phellinus linteus*) is about 1 grams to 100 grams, or about 2 to 75 grams, or about 2 to 50 grams, or about 2 to 25 grams, or about 3 to 15 grams, or any intervening range therein.

Zhuling (*Polyporus umbellatus*) is found in deciduous woodland regions in northeastern North America, Europe, and the temperate regions of China, commonly growing on dead and fallen trees and stumps. Good quality Zhu Ling is heavy and solid. The surface is ideally smooth and black while the inside should be white and without holes. A single serving of Zhu ling (*Polyporus umbellatus*) is about 0.01 grams to 20 grams, or about 0.05 to 15 grams, or about 0.1 to 10 grams, or about 0.3 to 7 grams, or about 0.3 to 5 grams, or any intervening range therein.

Fuling (*Poria cocos*) is a type of fungus related to *Polyporus*, which usually grows on pine trees. Although it can range in color from white to pale red, the typical color of *Poria* is light brown, with striations on the outer skin. It is relatively soft to the touch, odorless, and has slightly elastic properties. It is usually gathered from the tree, cut into pieces of various length, and dried in the shade before being used medicinally. The amount of Fuling (*Poria cocos*) in the in the supplement foods can vary. For example, a single daily serving of Fuling (*Poria cocos*) can range from about 0.5 to 100 grams, or about 1 to 50 grams, or about 2 to 25 grams, or about 5 to 20 grams, or any intervening range therein.

Seaweed and/or Kelp

The supplement foods described herein can include seaweed and/or kelp. Edible seaweed typically comes in three varieties: brown, red and green. The most commonly eaten are the brown varieties such as kelp and wakame, followed by red seaweed, which includes nori (yep, which is what most sushi chefs use). Seaweed contains vitamins A and C, and is also a source of potassium and calcium. Seaweed and kelp are also an excellent source of iodine.

Examples of sources of seaweeds and/or kelp include pharmaceutical grade kelp extracts, kelp powders, seaweed powders, and/or kelp extracts. Other examples of sources of seaweeds and/or kelp include pharmaceutical grade *Spirulina* powder, pharmaceutical grade blue green algae powder (e.g., from AFA Lake & Sea), pharmaceutical grade *Chlorella* Powder (e.g., from Medical Technology Co., Ltd).

The amount of seaweed and/or kelp in the in the supplement foods can vary. For example, a single daily serving of seaweed or kelp can range from about 0.005 to 200 grams, or about 0.01 to 150 grams, or about 0.02 to 100 grams, or about 0.5 to 20 grams, or any intervening range therein. In some cases, a single serving of seaweed or kelp can be about 70 mg.

Freshness Preservation Compound(s)

The supplement foods described herein can include ingredients that maintain or improve the freshness of the supplement food formulation. Examples of such freshness preservation ingredients can be potassium benzoate, β-cyclodextrin, γ-cyclodextrin, or a combination thereof.

The amounts of freshness preservation ingredients can vary. For example, the freshness preservation ingredients can be included in the supplement foods at about 0.01% by weight to about 5% by weight of the supplement food weight. In some cases, the freshness preservation ingredients can be included in the supplement foods at about 0.05% by weight to about 3% by weight, or at about 0.1% by weight to about 2% by weight of the supplement food weight Flavoring Agents The supplement foods can also contain any one of a variety of known flavoring agents. For example, the supplement can contain flavoring agents. Exemplary flavoring agents include natural or artificial flavorings such as strawberry, plum, banana, blueberry, cherry, cinnamon, coconut, coffee, chocolate (e.g., dark chocolate), raspberry, grape, green apple, lemon, mango, menthol, mint, mojito, orange, peach, pear, pineapple, pomegranate, root beer, tobacco, vanilla, watermelon, and combinations thereof. The flavoring agents can also include complex sugars such as fructose, and other flavoring agents known in the arts, such as polysaccharides.

Artificial sweeteners can also be used. It may be desirable, however, for the supplement to be comprised substantially, even entirely, of naturally occurring sweeteners and/or no sweeteners. There is no real limit on the amount of flavoring agent but the supplements have a mild taste that generally needs no added flavoring agents. Enough flavoring agent can be included to produce a supplement having a desirable taste. Methods are available that can be used to determine what flavoring agents, and levels thereof, should be included in the supplement. The composition can be provided free of flavoring agents as well.

Additional Ingredients

The supplements described herein can also contain additional ingredients. For example, the supplements can include extracts from plants such as yew, pine, hemlock, ginger, poppy, or combinations thereof. The supplements can also contain ingredients such as vinca alkaloids (e.g., benzophenanthridine alkaloids), phenolics, xanthones, other terpenoids, paclitaxel, carnosic acid, Noscapine, phytoalexins, sulforaphane, luteolin, betulinic acid, lunasin, plumbagin, gallic acid-based steroidal phenstatin analogs, cryptotanshinone, ursolic acid, coumarins, ginsenosides, withanolides, paclitaxel, carboplatin, pomolic acid, 1,4-naphthoquinones (e.g., from *Diospyros* L.), 4-shogaol (e.g., from ginger), sanguinarine, α-mangostin, magnolol, or any combination thereof (see, e.g., Park, EXCLI Journal 11:386-389 (2012) for further information on some of these ingredients).

Carrier

The supplements described herein are generally liquid, powdered, or food formulation that may require no additives, additional solvents, or carriers. The supplements can be a concentrated formulation that can be diluted, combined or dissolved in a carrier or added to a food. In some cases, the components and/or the completed supplement formulations can be freeze dried or concentrated to reduce the volume of the supplements (e.g., for ease of shipping or to generate a desired serving size). Such dry or concentrated supplement formulations can be combined with a carrier, drink, or food.

The carrier can be any substance that can form a homogenous mixture with the supplement components, and that can be dispensed in a manner to provide a predetermined serving size. The carrier should not interfere with any of the beneficial ingredients of the supplement or inhibit the desired activity. The amount of carrier is entirely within the discretion of the formulator, although higher levels of carrier may excessively dilute the supplement. In addition, certain levels of carrier may be used to obtain a desired serving size, a desired taste, or a desired texture or consistency. For example, the supplement can comprise about 10 wt % carrier to about 50 wt %.

Supplement food formulations can include various sweetening agents or natural carbohydrates, as is the case with conventional drinks Preferably, the natural carbohydrate can include monosaccharides such as glucose and fructose, di-saccharides such as maltose and sucrose, polysaccharides such as dextrin and cyclodextrin, and sugar alcohols such as xylitol, sorbitol and erythritol. The sweetening agent can include natural substances such as thaumatin and stevioside and synthetic substances such as saccharin and aspartame. The carbohydrates can be added in the ratio of from 0.01 to 0.04 g per 100 mL of the present composition, and more preferably, in the ratio of from 0.02 to 0.03 g per 100 g of the composition.

The composition of the present invention can further include various nutrients, vitamin, electrolytes, flavoring agents or coloring agents and pectic acids and its salts, alginic acid and its salts, protective colloids, viscosity enhancers, pH controllers, stabilizers, preservatives, glycerin, alcohols, carbonating agents for carbonated drinks. In some cases, the supplement can include additional protein (whey, pea proteins, casein, hemp protein, or combinations thereof).

The supplement can include additional ingredients, such as preservatives, coloring agents, thickening agents, and other agents typically used in such supplements and known to those of skill in the art, that do not affect the activity of the above described active ingredients.

The supplement food can be formulated into bars, rolls, buns, breads, chocolates, candies, snack items, cookies, noodles, gums, dairy products such as ice cream, soups, drinks, teas, alcohols, juices, and sports drink.

The supplement foods can include natural fruit juices, fruit juice drinks and fresh vegetable slurries. The constituents mentioned above can be used independently or in combination Generally, the additive can be often added in a ratio of (but not limited to) from 0.01 to 0.1 wt parts per 100 wt parts of the present composition, The supplement can be prepared for oral administration, and can be in the form of a liquid drink. The supplement can be formulated to be taken as a daily supplement. For instance, the serving size can be at least about one-half fluid oz., or at least about 1 fluid oz., or at least 2 fluid oz., or at least 4 fluid oz. For example, when the supplement is provided with a 1 fl. oz. serving size, a full month supply can be sold in a single 32 fl. oz. bottle. These volumes correspond to the supplement in a drinkable fluid. It is contemplated that the consumer may shake the supplement prior to consumption to obtain a more homogenous mixture. It also is contemplated that the supplement could be diluted by the consumer. Of course, the supplement could also be diluted by the manufacturer. For instance, the supplement could be diluted and sold as a beverage, or it could be added to a beverage prior to sale.

The supplement food could also be provided as a health bar, where single servings of the various ingredients are formulated into a nutritional bar.

The supplement food could also be provided in the form of a gel, capsule, or tablet in which case the serving size could be distributed over several gels, several capsules, or several tablets.

When formulated for human consumption, the supplement should be free from any substances that are unsuitable for human consumption. Substances that are typically present only in topically applied compositions that render the composition unsuitable for consumption can be eliminated from the supplement. For example, some substances that can be excluded from the composition include emollients, petroleum-based substances, and fragrances and perfumes that are unintended and unsuitable for human consumption.

An example of a Supplement formulation is shown in Table 2.

TABLE 2

Supplement Composition

| Component | mg per Kg Body Weight (1 Serving) | mg per 70 Kg Body Weight (1 Serving) | mg per 100 Kg Body Weight (1 Serving) |
|---|---|---|---|
| Amino Acids | | | |
| Alanine | 5.8 | 406 | 588 |
| Arginine | 8.18 | 572.6 | 818 |
| Aspartic Acid | 1.092 | 76.44 | 1092 |
| Cystine | 2.88 | 201.6 | 288 |
| Glutamic Acid | 2.065 | 144.55 | 206.5 |
| Glycine | 3.78 | 264.6 | 378 |
| Histidine | 2.7 | 189 | 270 |
| Isoleucine | 7 | 490 | 700 |
| Lysine | 8 | 614 | 854 |
| Leucine | 10.91 | 763.7 | 1091 |
| Methionine | 2.76 | 193.2 | 276 |

TABLE 2-continued

Supplement Composition

| Component | mg per Kg Body Weight (1 Serving) | mg per 70 Kg Body Weight (1 Serving) | mg per 100 Kg Body Weight (1 Serving) |
|---|---|---|---|
| Phenylalanine | 11.2 | 784 | 1120 |
| Serine | 11.2 | 784 | 1120 |
| Proline | 7.32 | 512.4 | 732 |
| Threonine | 5.7 | 399 | 570 |
| Tryptophan | 1.87 | 130.9 | 187 |
| Tyrosine | 4.92 | 344.4 | 492 |
| Valine | 7.22 | 505.4 | 722 |
| Fulvic-humic acids | 20 | 1400 | 2000 |
| Multi-minerals | 20 | 25 | 30 |
| β-Alanine | 8 | 560 | 800 |
| 2,3-Diaminopropionic acid | 0.05 | 3.5 | 5 |
| α-Aminoisobutyric acid | 0.06 | 4.2 | 6 |
| N-Methylglycine (sarcosine) | 0.06 | 4.2 | 6 |
| Ornithine | 0.06 | 4.2 | 6 |
| Citrulline | 10 | 700 | 1000 |
| t-Butylalanine | 1 | 70 | 100 |
| t-Butylglycine | 1 | 70 | 100 |
| N-methylisoleucine | 0.1 | 7 | 10 |
| Phenylglycine | 0.01 | 0.7 | 1 |
| Cyclohexylalanine | 0.035 | 2.45 | 3.5 |
| Norleucine | 0.25 | 10.5 | 15 |
| Naphthylalanine | 0.1 | 7 | 10 |
| Pyridylalanine | 0.1 | 7 | 10 |
| 3-Benzothienyl alanine | 0.06 | 4.2 | 6 |
| 4-Chlorophenylalanine | 0.25 | 17.5 | 25 |
| 2-Fluorophenylalanine | 0.15 | 10.5 | 15 |
| 3-Fluorophenylalanine | 0.15 | 10.5 | 15 |
| 4-Fluorophenylalanine | 0.15 | 10.5 | 15 |
| Penicillamine | 3.75 | 262.5 | 375 |
| 1,2,3,4-Tetrahydro-isoquinoline-3-carboxylic acid | 0.25 | 17.5 | 25 |
| E-2-thienylalanine | 0.06 | 4.2 | 6 |
| Methionine sulfoxide | 4.7 μg | 329 μg | 470 μg |
| Homoarginine | 1.28 | 89.6 | 125 |
| N-acetyl lysine | 6 | 420 | 600 |
| 2,4-Diamino butyric acid | 0.01 | 0.7 | 1 |
| D-Aminophenylalanine | 1 | 70 | 100 |
| N-methylvaline | 0.07 | 4.9 | 7 |
| Homocysteine | 1 | 70 | 100 |
| Homoserine | 0.3 | 21 | 30 |
| Amino hexanoic acid | 0.01 | 0.7 | 1 |
| Amino valeric acid | 1.28 | 89.6 | 128 |
| 2,3-Diaminobutyric acid | 0.01 | 0.7 | 1 |
| Phosphatidylinositol | | | |
| Phosphatidylinositol | 0.6 | 42 | 60 |
| Coconut Extractions | | | |
| Caprylic Acid | 15 | 1050 | 1500 |
| MCT | 25 | 1750 | 2500 |
| Coconut Oil | 40 | 2800 | 4000 |
| Glycerin | | | |
| Glycerin | 45 | 3150 | 4500 |
| Terpenes/Sesquiterpene alkaloids | | | |
| Alpha-Humulene | 2.5 | 175 | 250 |
| Alpha-Phellandrene | 10 | 700 | 1000 |
| Alpha-pinene | 4.5 | 315 | 450 |
| Alpha-Terpinene | 2.5 | 175 | 250 |
| Alpha-Terpinolene | 26 | 1820 | 2600 |
| Beta-Myrcene | 0.7 | 49 | 70 |
| Beta-pinene | 5 | 350 | 500 |
| Camphene | 0.6 | 42 | 60 |
| Cis-Ocimene | 2 | 140 | 200 |
| Delta-3 Carene | 1.1 | 77 | 110 |
| Limonene | 30 | 2100 | 3000 |
| Sabinene | 2.5 | 175 | 250 |
| Trans-Caryophyllene | 1.4 | 98 | 140 |
| Trans-Ocimene | 1.1 | 77 | 110 |
| Y-Terpinene | 1.5 | 105 | 150 |
| 1.8-Cineole | 1.8 | 126 | 180 |
| Perillyl alcohol | 1 | 70 | 100 |
| Flax seeds, Raw pepita seeds, Chia seeds | Cold Pressed Plant/Seed Oil | | |
| Omega-6 linoleic acid (LA) | 7 | 490 | 700 |
| Omega-3 alpha-linolenic acid (ALA) | 2.5 | 175 | 250 |
| Omega-9 | 2 | 140 | 200 |
| Omega-6 gamma linolenic acid (GLA) | 0.5 | 35 | 500 |
| Omega-3 stearidonic acid (SDA) | 0.25 | 175 | 250 |
| Black Seeds | | | |
| Black seeds | 4 | 280 | 400 |
| Goji berries | | | |
| Goji berries | 2 | 140 | 200 |
| Seaweed and/or kelp | | | |
| Seaweed and/or kelp | 1 | 70 | 100 |
| Fenugreek | | | |
| 95% + Fenugreek extract | 48 | 3360 | 4800 |
| Monk Fruit | | | |
| 95% + monk fruit extract | 5 | 350 | 100 |
| Artemisia ludoviciana | | | |
| 95% + Artemisia ludoviciana extract | 5 | 350 | 500 |
| Mushroom Extracts | | | |
| Brazillian Blazei (Agaricus blazei) | 2 | 70-140 | 100-200 |
| Caterpillar Mushroom (Cordyceps sinensis, renamed Ophiocordyceps sinensis) | 2 | 70-140 | 100-200 |
| Enoki (Flammulina velutipes) | 2 | 70-140 | 100-200 |
| Agarikon (Fomitopsis officinalis, also known as Laricifomes officinalis) | 2 | 70-140 | 100-200 |
| Turkey Tail (Coriolus versicolor, also known as Trametes versicolor) | 2 | 70-140 | 100-200 |
| Shitake | 2 | 70-140 | 100-200 |
| Red Reishi | 4 | 140-280 | 200-400 |
| Fuling (Poria cocos) | 2 | 70-140 | 100-200 |
| Zhu ling (Polyporus umbellatus) | 2 | 70-140 | 100-200 |
| Mesimakobu (Phellinus linteus) | 2 | 70-140 | 100-200 |
| Birch polypore (Piptoporus betulinus) | 2 | 70-140 | 100-200 |
| Inonotus obliquus | 2 | 70-140 | 100-200 |
| Hericium erinaceus | 2 | 70-140 | 100-200 |
| Maitake (Grifola frondosa) | 4 | 140-280 | 200-400 |
| Artist Conk (Ganoderma applanatum) | 2 | 70-140 | 100-200 |
| Freshness preservation compound(s) | | | |
| Potassium benzoate | 0.02 | 1.4 | 2 |
| β-cyclodextrin | 0.02 | 1.4 | 2 |
| γ-cyclodextrin | 0.02 | 1.4 | 2 |

The amounts shown in Table 2 can be varied by about 5%, or by about 10%, or by about 20%, or by about 50%. The Supplement has no negative side effects at even high dosages. Subjects can take the supplement 1 to 7 times a day, or 1 to 5 three times a day, or 1 to 3 three times a day.

Benefits of the Supplement

Patients report that the supplement described herein provides several benefits, which are described below.

Hunger reduction by ⅓ to ½ with daily usage;

Meal replacement;

Belly (abdominal) fat reduction;

Energy and mentation (more focused) increases within one week;

Gastrointestinal tract normalization with daily use;

Immune stimulation/supplementation (e.g., users did not get sick when others around them were getting sick; often complete avoidance of illness compared to family and friends in same proximity);

Cancer patients sent home to die lived months to years longer using this product after they failed life-saving and often 'last ditch' radiation and chemotherapy:

Specific cancers where this worked were breast, colon, prostate and glioblastoma; and Some complete tumor remission was noted in terminally ill patients.

Methods

Also described herein is a method of administering any of the supplements described herein to a subject. The subject can be a human, domesticated animal, experimental animal, or zoo animal.

The supplements can be liquid or solid. For example, the compositions can be dried and mixed with foods. In some cases, the supplements are in liquid form.

The supplements can be administered in an amount effective to reduce pain, reduce the incidence and symptoms of disease (e.g., of cancer, flu, colds), increase energy, improve sleep patterns, increase activity levels, reduce extremity numbness, improve digestion, reduce gastrointestinal problems (e.g., reduce constipation, bloating, diarrhea), reduce the incidence or severity of headaches, reduce the frequency or severity of seizures, reduce weight gain, facilitate weight loss, or combinations thereof, compared to healthy subjects, compared to a subject of the same species that does not receive the supplement, or compared to the subject's own experience prior to taking the supplements.

For example, a single serving of the supplement can be about 0.25 fluid ounces to about 12 fluid ounces, or about 0.5 fluid ounces to about 8 fluid ounces, or 1 fluid ounces to about 6 fluid ounces.

The supplements can be administered or taken at least once per week for four weeks. In some the supplements are routinely administered or ingested daily, biweekly, triweekly, weekly and/or via a sustained regimen over time (e.g., over one or more months, or over one or more years).

The following Examples illustrate some aspects of the invention. Note that the composition described herein that is administered is referred to as the Supplement.

Example 1: An Example of a Supplement Formulation

Table 2, below, shows an example of a Supplement composition.

TABLE 2

| | Supplement Composition | | |
|---|---|---|---|
| Component | mg per Kg Body Weight (1 Serving) | mg per 70 Kg Body Weight (1 Serving) | mg per 100 Kg Body Weight (1 Serving) |
| Amino Acids | | | |
| Alanine | 5.8 | 406 | 588 |
| Arginine | 8.18 | 572.6 | 818 |
| Aspartic Acid | 1.092 | 76.44 | 1092 |
| Cystine | 2.88 | 201.6 | 288 |
| Glutamic Acid | 2.065 | 144.55 | 206.5 |
| Glycine | 3.78 | 264.6 | 378 |
| Histidine | 2.7 | 189 | 270 |
| Isoleucine | 7 | 490 | 700 |
| Lysine | 8 | 614 | 854 |
| Leucine | 10.91 | 763.7 | 1091 |
| Methionine | 2.76 | 193.2 | 276 |
| Phenylalanine | 11.2 | 784 | 1120 |
| Serine | 11.2 | 784 | 1120 |
| Proline | 7.32 | 512.4 | 732 |
| Threonine | 5.7 | 399 | 570 |
| Tryptophan | 1.87 | 130.9 | 187 |
| Tyrosine | 4.92 | 344.4 | 492 |
| Valine | 7.22 | 505.4 | 722 |
| Fulvic-humic acids | 20 | 1400 | 2000 |
| Multi-minerals | 20 | 25 | 30 |
| β-Alanine | 8 | 560 | 800 |
| 2,3-Diaminopropionic acid | 0.05 | 3.5 | 5 |
| α-Aminoisobutyric acid | 0.06 | 4.2 | 6 |
| N-Methylglycine (sarcosine) | 0.06 | 4.2 | 6 |
| Ornithine | 0.06 | 4.2 | 6 |
| Citrulline | 10 | 700 | 1000 |
| t-Butylalanine | 1 | 70 | 100 |
| t-Butylglycine | 1 | 70 | 100 |
| N-methylisoleucine | 0.1 | 7 | 10 |
| Phenylglycine | 0.01 | 0.7 | 1 |
| Cyclohexylalanine | 0.035 | 2.45 | 3.5 |
| Norleucine | 0.25 | 10.5 | 15 |
| Naphthylalanine | 0.1 | 7 | 10 |
| Pyridylalanine | 0.1 | 7 | 10 |
| 3-Benzothienyl alanine | 0.06 | 4.2 | 6 |
| 4-Chlorophenylalanine | 0.25 | 17.5 | 25 |
| 2-Fluorophenylalanine | 0.15 | 10.5 | 15 |
| 3-Fluorophenylalanine | 0.15 | 10.5 | 15 |
| 4-Fluorophenylalanine | 0.15 | 10.5 | 15 |
| Penicillamine | 3.75 | 262.5 | 375 |
| 1,2,3,4-Tetrahydro-isoquinoline-3-carboxylic acid | 0.25 | 17.5 | 25 |
| E-2-thienylalanine | 0.06 | 4.2 | 6 |
| Methionine sulfoxide | 4.7 μg | 329 μg | 470 μg |
| Homoarginine | 1.28 | 89.6 | 125 |
| N-acetyl lysine | 6 | 420 | 600 |
| 2,4-Diamino butyric acid | 0.01 | 0.7 | 1 |
| D-Aminophenylalanine | 1 | 70 | 100 |
| N-methylvaline | 0.07 | 4.9 | 7 |
| Homocysteine | 1 | 70 | 100 |
| Homoserine | 0.3 | 21 | 30 |
| Amino hexanoic acid | 0.01 | 0.7 | 1 |
| Amino valeric acid | 1.28 | 89.6 | 128 |
| 2,3-Diaminobutyric acid | 0.01 | 0.7 | 1 |
| Phosphatidylinositol | | | |
| Phosphatidylinositol | 0.6 | 42 | 60 |
| Coconut Extractions | | | |
| Caprylic Acid | 15 | 1050 | 1500 |
| MCT | 25 | 1750 | 2500 |
| Coconut Oil | 40 | 2800 | 4000 |

TABLE 2-continued

Supplement Composition

| Component | mg per Kg Body Weight (1 Serving) | mg per 70 Kg Body Weight (1 Serving) | mg per 100 Kg Body Weight (1 Serving) |
|---|---|---|---|
| | Glycerin | | |
| Glycerin | 45 | 3150 | 4500 |
| | Terpenes/Sesquiterpene alkaloids | | |
| Alpha-Humulene | 2.5 | 175 | 250 |
| Alpha-Phellandrene | 10 | 700 | 1000 |
| Alpha-pinene | 4.5 | 315 | 450 |
| Alpha-Terpinene | 2.5 | 175 | 250 |
| Alpha-Terpinolene | 26 | 1820 | 2600 |
| Beta-Myrcene | 0.7 | 49 | 70 |
| Beta-pinene | 5 | 350 | 500 |
| Camphene | 0.6 | 42 | 60 |
| Cis-Ocimene | 2 | 140 | 200 |
| Delta-3 Carene | 1.1 | 77 | 110 |
| Limonene | 30 | 2100 | 3000 |
| Sabinene | 2.5 | 175 | 250 |
| Trans-Caryophyllene | 1.4 | 98 | 140 |
| Trans-Ocimene | 1.1 | 77 | 110 |
| Y-Terpinene | 1.5 | 105 | 150 |
| 1.8-Cineole | 1.8 | 126 | 180 |
| Perillyl alcohol | 1 | 70 | 100 |
| Flax seeds, Raw pepita seeds, Chia seeds | Cold Pressed Plant/Seed Oil | | |
| Omega-6 LA | 7 | 490 | 700 |
| Omega-3 ALA | 2.5 | 175 | 250 |
| Omega-9 | 2 | 140 | 200 |
| Omega-6 GLA | 0.5 | 35 | 500 |
| Omega-3 SDA | 0.25 | 175 | 250 |
| | Black Seeds | | |
| Black seeds | 4 | 280 | 400 |
| | Goji berries | | |
| Goji berries | 2 | 140 | 200 |
| | Seaweed and/or kelp | | |
| Seaweed and/or kelp | 1 | 70 | 100 |
| | Fenugreek | | |
| 95% + Fenugreek extract | 48 | 3360 | 4800 |
| | Monk Fruit | | |
| 95% + monk fruit extract | 5 | 350 | 100 |
| | *Artemisia ludoviciana* | | |
| 95% + *Artemisia ludoviciana* extract | 5 | 350 | 500 |
| | Mushroom Extracts | | |
| Brazillian Blazei (*Agaricus blazei*) | 2 | 70-140 | 100-200 |
| Caterpillar Mushroom (*Cordyceps sinensis*, renamed *Ophiocordyceps sinensis*) | 2 | 70-140 | 100-200 |
| Enoki (*Flammulina velutipes*) | 2 | 70-140 | 100-200 |
| Agarikon (*Fomitopsis officinalis*, also known as *Laricifomes officinalis*) | 2 | 70-140 | 100-200 |
| Turkey Tail (*Coriolus versicolor*, also known as *Trametes versicolor*) | 2 | 70-140 | 100-200 |
| Shitake | 2 | 70-140 | 100-200 |
| Red Reishi | 4 | 140-280 | 200-400 |
| Fuling (*Poria cocos*) | 2 | 70-140 | 100-200 |
| Zhu ling (*Polyporus umbellatus*) | 2 | 70-140 | 100-200 |
| Mesimakobu (*Phellinus linteus*) | 2 | 70-140 | 100-200 |
| Birch polypore (*Piptoporus betulinus*) | 2 | 70-140 | 100-200 |
| *Inonotus obliquus* | 2 | 70-140 | 100-200 |
| *Hericium erinaceus* | 2 | 70-140 | 100-200 |
| Maitake (*Grifola frondosa*) | 4 | 140-280 | 200-400 |
| Artist Conk (*Ganoderma applanatum*) | 2 | 70-140 | 100-200 |
| | Freshness preservation compound(s) | | |
| Potassium benzoate | 0.02 | 1.4 | 2 |
| β-cyclodextrin | 0.02 | 1.4 | 2 |
| γ-cyclodextrin | 0.02 | 1.4 | 2 |

Table 3, below, shows dosages of the Supplement that can be taken 2 to 3 times per day.

TABLE 3

Supplement Dosages

| OZ per Kg Body Weight (1 Serving) | OZ per 100 Kg Body Weight (1 Serving) | OZ per 70 Kg Body Weight (1 Serving) |
|---|---|---|
| 5 ml to 20 ml | 1 oz to 3 oz | 1 oz to 3 oz |

Example 2: Manufacture of the Supplement

This Example illustrates a method of making the Supplement.

Tables 4 and 5 list the components of the Supplement in groups, where the groups of components are referred to as Mixtures. For example, the components of a Mixture are sufficiently similar in chemical and physical properties to be handled together in the manufacturing process.

In Table 4, the amounts of each component that can be included in a gallon of the Supplement are listed opposite the component.

TABLE 4

Mixtures of Components

| # | Component | Amount |
|---|---|---|
| 1 | | LQ Mixture add 1st |
| 2 | Vegetable Glycerin | (48 oz per gallon) |
| 3 | Coconut oil | (28 oz per gallon) |
| 4 | | |
| 5 | | |
| 6 | | MCT OIL Mixture add 2nd |

TABLE 4-continued

Mixtures of Components

| # | Component | Amount |
|---|---|---|
| 7 | Oil (MCT) Caprylic/Capric/Triglycerides | 15 ml/100 Kg (6 oz per gallon) |
| 8 | 8-Carbon MCT | 15 ml/100 Kg (6 oz per gallon) |
| 9 | MCT Medium Chain Triglycerides | 15 ml/100 Kg (6 oz per gallon) |
| 10 | | |
| 11 | | |
| 12 | Amino Acid Mixture add 5th | |
| 13 | All in one multiple vitamin, mineral, and antioxidant | 30 ml/100 Kg (per gallon) |
| 14 | Glycine | 1 gram/100 Kg (512 grams per gallon) |
| 15 | Humic Acids | 15 ml/100 Kg (1024 grams per gallon) |
| 16 | Fulvic | 15 ml/100 Kg (1024 grams per gallon) |
| 17 | Isoleucine | 3 grams/100 Kg (1024 grams per gallon) |
| 18 | L-Tyrosine | 1000 mg/100 Kg |
| 19 | D-Aspartic Acid | 2000 mg/100 Kg (512 grams per gallon) |
| 20 | L-Tryptophan | ¼ tsp/1 gram (512 grams per gallon) |
| 21 | L-Valine | 5 ml/2000 mg (512 grams per gallon) |
| 22 | L-Proline | 2 grams/100 Kg (1024 grams per gallon) |
| 23 | L-Histidine | 500 mg/100 Kg (256 grams per gallon) |
| 24 | L-Lysine | 550 mg/100 Kg (287 grams per gallon) |
| 25 | N-Acetyl L-Cysteine | 1000 mg/100 Kg (512 grams per gallon) |
| 26 | L-Methionine | 500 mg/100 Kg (256 grams per gallon) |
| 27 | L-Serine | 5 ml/2000 mg/100 Kg (512 grams per gallon) |
| 28 | Beta Alanine | 4000 mg/100 Kg (1024 grams per gallon) |
| 29 | Plant Protein | 4 grams |
| 30 | β-Alanine | 80 g per gallon |
| 31 | 2,3-Diaminopropionic acid | 50 g per gallon |
| 32 | α-Aminoisobutyric acid | 60 g per gallon |
| 33 | N-Methylglycine (sarcosine) | 60 g per gallon |
| 34 | Ornithine | 60 g per gallon |
| 35 | Citrulline | 100 g per gallon |
| 36 | t-Butylalanine | 100 g per gallon |
| 37 | t-Butylglycine | 100 g per gallon |
| 38 | N-methylisoleucine | 30 g per gallon |
| 39 | Phenylglycine | 10 g per gallon |
| 40 | Cyclohexylalanine | 30 g per gallon |
| 41 | Norleucine | 150 g per gallon |
| 42 | Naphthylalanine | 100 g per gallon |
| 43 | Pyridylalanine | 100 g per gallon |
| 44 | 3-Benzothienyl alanine | 60 g per gallon |
| 45 | 4-Chlorophenylalanine | 250 g per gallon |
| 46 | 2-Fluorophenylalanine | 150 g per gallon |
| 47 | 3-Fluorophenylalanine | 150 g per gallon |
| 48 | 4-Fluorophenylalanine | 150 g per gallon |
| 49 | Penicillamine | 375 g per gallon |
| 50 | 1,2,3,4-Tetrahydro-isoquinoline-3-carboxylic acid | 250 g per gallon |
| 51 | E-2-thienylalanine | 60 g per gallon |
| 52 | Methionine sulfoxide | 4700 µg per gallon |
| 53 | Homoarginine | 454 g per gallon |
| 54 | N-acetyl lysine | 600 g per gallon |
| 55 | 2,4-Diamino butyric acid | 10 g per gallon |
| 56 | D-Aminophenylalanine | 100 g per gallon |
| 57 | N-methylvaline | 70 g per gallon |
| 58 | Homocysteine | 100 g per gallon |
| 59 | Homoserine | 300 g per gallon |
| 60 | Amino hexanoic acid | 10 g per gallon |
| 61 | Amino valeric acid | 800 g per gallon |
| 62 | 2,3-Diaminobutyric acid | 10 g per gallon |
| 63 | | |
| 64 | Powder Mixture add 6th | |
| 65 | Frankincense powder *Boswellia Serrata* | 1500 mg/100 Kg (454 grams per gallon) |
| 66 | *Artemisia ludoviciana* | 300 mg/¼ tsp/100 Kg (454 grams per gallon) |
| 67 | Black Seeds | 10 ml/kg (227 grams per gallon) |
| 68 | | |
| 69 | Goji berry Mixture add 10th | |
| 70 | Goji berries | 1500 mg/100 Kg (454 grams per gallon) |
| 71 | | |
| 72 | Monk Fruit Mixture add 9th | |
| 73 | Monk Fruit | 1500 mg/100 Kg (454 grams per gallon) |
| 74 | | |

TABLE 4-continued

| | Mixtures of Components | |
|---|---|---|
| # | Component | Amount |
| 75 | Seaweed and/or kelp Mixture add 8th | |
| 76 | Seaweed and/or kelp | 1500 mg/100 Kg |
| | | 18 oz (454 grams per gallon) |
| 77 | | |
| 78 | Mushroom Extract Mixture add 7th | |
| 79 | Brazillian Blazei (*Agaricus blazei*) | 5 ml/2000 mg/100 Kg |
| | | (512 grams per gallon) |
| 80 | Caterpillar Mushroom (*Cordyceps sinensis*, renamed *Ophiocordyceps sinensis*) | 5 ml/2000 mg/100 Kg (512 grams per gallon) |
| 81 | Enoki (*Flammulina velutipes*) | 5 ml/2000 mg/100 Kg |
| | | (512 grams per gallon) |
| 82 | Agarikon (*Fomitopsis officinalis*, also known as *Laricifomes officinalis*) | 5 ml/2000 mg/100 Kg (512 grams per gallon) |
| 83 | Turkey Tail (*Coriolus versicolor*, also known as *Trametes versicolor*) | 5 ml/2000 mg/100 Kg (512 grams per gallon) |
| 84 | Shitake | 5 ml/2000 mg/100 Kg |
| | | (512 grams per gallon) |
| 85 | Red Reishi | 5 ml/2000 mg/100 Kg |
| | | (512 grams per gallon) |
| 86 | Fuling (*Poria cocos*) | 5 ml/2000 mg/100 Kg |
| | | (512 grams per gallon) |
| 87 | Zhu ling (*Polyporus umbellatus*) | 5 ml/2000 mg/100 Kg |
| | | (512 grams per gallon) |
| 88 | Mesimakobu (*Phellinus linteus*) | 5 ml/2000 mg/100 Kg |
| | | (512 grams per gallon) |
| 89 | Birch polypore (*Piptoporus betulinus*) | 5 ml/2000 mg/100 Kg |
| | | (512 grams per gallon) |
| 90 | *Inonotus obliquus* | 5 ml/2000 mg/100 Kg |
| | | (512 grams per gallon) |
| 91 | *Hericium erinaceus* | 5 ml/2000 mg/100 Kg |
| | | (512 grams per gallon) |
| 92 | Maitake (*Grifola frondosa*) | 5 ml/2000 mg/100 Kg |
| | | (512 grams per gallon) |
| 93 | Artist Conk (*Ganoderma applanatum*) | 5 ml/2000 mg/100 Kg |
| | | (512 grams per gallon) |
| 94 | | |
| 95 | Terpenes/Sesquiterpene alkaloid Mixture add 3rd | |
| 96 | Alpha-Humulene | 12 ml/Kg (18 oz per gallon) |
| 97 | Alpha-Phellandrene | 12 ml/Kg (18 oz per gallon) |
| 98 | Alpha-pinene | 12 ml/Kg (18 oz per gallon) |
| 99 | Alpha-Terpinene | 12 ml/Kg (18 oz per gallon) |
| 100 | Alpha-Terpinolene | 12 ml/Kg (18 oz per gallon) |
| 101 | Beta-Myrcene | 12 ml/Kg (18 oz per gallon) |
| 102 | Beta-pinene | 12 ml/Kg (18 oz per gallon) |
| 103 | Camphene | 12 ml/Kg (18 oz per gallon) |
| 104 | Cis-Ocimene | 12 ml/Kg (18 oz per gallon) |
| 105 | Delta-3 Carene | 12 ml/Kg (18 oz per gallon) |
| 106 | Limonene | 12 ml/Kg (18 oz per gallon) |
| 107 | Sabinene | 12 ml/Kg (18 oz per gallon) |
| 108 | Trans-Caryophyllene | 12 ml/Kg (18 oz per gallon) |
| 109 | Trans-Ocimene | 12 ml/Kg (18 oz per gallon) |
| 110 | Y-Terpinene | 12 ml/Kg (18 oz per gallon) |
| 111 | 1.8-Cineole | 12 ml/Kg (18 oz per gallon) |
| 112 | Perillyl alcohol | 12 ml/Kg (18 oz per gallon) |
| 113 | | |
| 114 | Cold Pressed Plant/Seed Oil Mixture add 4th | |
| 115 | Flax seeds, Raw pepita seeds, Chia seeds | (12 oz per gallon)/(454 grams per gallon) |
| 116 | Omega-6 LA | (12 oz per gallon)/(454 grams per gallon) |
| 117 | Omega-3 ALA | (12 oz per gallon)/(454 grams per gallon) |
| 118 | Omega-9 | (12 oz per gallon)/(454 grams per gallon) |
| 119 | Omega-6 GLA | (12 oz per gallon)/(454 grams per gallon) |
| 120 | Omega-3 SDA | (12 oz per gallon)/(454 grams per gallon) |
| 121 | | |
| 122 | Freshness preservation compound Mixture add 11th | |
| 123 | Potassium benzoate | 8 grams per gallon |
| 124 | β-cyclodextrin | 8 grams per gallon |
| 125 | γ-cyclodextrin | 8 grams per gallon |

Table 5 illustrates the Mixtures that can used in a manufacturing process for making the Supplement.

TABLE 5

Mixtures for Manufacturing

LQ Mixture add 1st

1. Pharmaceutical grade vegetable glycerin oil.
2. Coconut oil

MCT Oil Mixture add 2nd

3. Oil (MCT) Caprylic acid/Capric acid/Triglycerides
4. 8-Carbon MCT
5. MCT Medium Chain Triglycerides Terpenes/Sesquiterpene alkaloids Mixture add 3rd 6. Alpha-Humulene
7. Alpha-Phellandrene
8. Alpha-pinene
9. Alpha-Terpinene
10. Alpha-Terpinolene
11. Beta-Myrcene
12. Beta-pinene
13. Camphene
14. Cis-Ocimene
15. Delta-3 Carene
16. Limonene
17. Sabinene
18. Trans-Caryophyllene
19. Trans-Ocimene
20. Y-Terpinene
21. 1.8-Cineole
22. Perillyl alcohol Cold Pressed Plant/Seed Oil Mixture add 4th Flax seeds, Raw pepita seeds, Chia seeds
23. Omega-6 LA
24. Omega-3 ALA
25. Omega-9
26. Omega-6 GLA
27. Omega-3 SDA Amino acids Mixture add 5th 28. to 49. Combine components 13 to 62 from Table 4

Powder Mix Mixture add 6th

50. Frankincense powder *Boswellia Serrata*
51. *Artemisia ludoviciana*
52. Black Seeds Mushroom Extract Mixture Combine in Order and add 7th 53. to 67. Combine components 79 to 93 from Table 4

Seaweed and/or kelp Mixture Combine in Order and add 8th

68. Seaweed and/or kelp

Monk Fruit Mixture Combine in Order and add 9th

69. Monk Fruit

Goji berry Mixture Combine in Order and add 10th

70. Goji berries

Freshness preservation compound(s) Mixture Combine in Order and add 11th

71. Potassium benzoate
72. β-cyclodextrin
73. γ-cyclodextrin

The following procedure was used to prepare the supplement.

The LQ Mixture was formed by mixing (at 300-1200 rpm) 48 oz. per gallon pharmaceutical grade vegetable glycerin oil (component #1) and 28 oz. per gallon coconut oil (component #2) together, with heating up to about 118° F. (47-48° C.) to combine the ingredients.

The MCT/Coconut oil mixture was formed by mixing (at 300-1200 rpm) 15 ml/100 Kg (6 oz per gallon) each of the following: Oil (MCT) Caprylic acid/Capric acid/Triglycerides, 8-Carbon MCT, and MCT Medium Chain Triglycerides (components 3, 4, and 5) together with heating up to about 118° F. (47-48° C.) to combine the ingredients.

The Terpenes/Sesquiterpene alkaloid mixture was formed by mixing (at 300-1200 rpm) 12 ml/Kg (18 oz per gallon) of each of components 6 to 22 shown in Table 5 together with heating up to about 118° F. (47-48° C.).

The Cold Pressed Plant/Seed Oil mixture was formed by mixing (at 300-1200 rpm) 12 oz per gallon)/(454 grams per gallon) of each of components 23 to 27 shown in Table 5 together with heating up to about 118° F. (47-48° C.). Flax seeds, raw pepita seeds, and/or chia seeds can a source of the Cold Pressed Plant/Seed Oil. Optionally, whole or powdered flax seeds, raw pepita seeds, and/or chia seeds can be included in the Cold Pressed Plant/Seed Oil Mixture.

The Amino Acid mixture was formed by mixing (at 300-1200 rpm) each of components 13 to 62 shown in Table 4 using the amounts shown in Table 4 with heating up to about 118° F. (47-48° C.).

The Powder Mixture was formed by mixing (at 300-1200 rpm) 1500 mg/100 Kg (454 grams per gallon) of Frankincense powder *Boswellia serrata* (component 50), with 300 mg/¼ tsp/100 Kg (454 grams per gallon) of *Artemisia ludoviciana* (component 51), and with 10 ml/kg (227 grams per gallon) (50 to 52) of Black Seeds (component 52), with heating up to about 118° F. (47-48° C.).

The Mushroom Extract mixture was formed by mixing (at 300-1200 rpm) 5 ml/2000 mg/100 Kg (512 grams per gallon) of each of components 79 to 93 from Table 4 with heating up to about 118° F. (47-48° C.).

The Seaweed and/or Kelp Mixture was formed by mixing (at 300-1200 rpm) 18 oz (454 grams per gallon; 1500 mg/100 Kg) of the seaweed and/or kelp with heating up to about 118° F. (47-48° C.).

The Monk Fruit Mixture was formed by mixing (at 300-1200 rpm) 1500 mg/100 Kg (454 grams per gallon) Monk Fruit with heating up to about 118° F. (47-48° C.).

The Goji berry Mixture was formed by mixing (at 300-1200 rpm) 1500 mg/100 Kg (454 grams per gallon) Goji berries with heat up to about 118° F. (47-48° C.).

The Freshness preservation compound Mixture was formed by mixing (at 300-1200 rpm) 8 grams per gallon of each of potassium benzoate, β-cyclodextrin, and/or γ-cyclodextrin with heating up to about 118° F. (47-48° C.). In some cases, one of the following was included in the Supplement: potassium benzoate, β-cyclodextrin, or γ-cyclodextrin. In some cases, two of the following were included in the Supplement: potassium benzoate, β-cyclodextrin, or γ-cyclodextrin. In some cases, three of the following were included in the Supplement: potassium benzoate, β-cyclodextrin, or γ-cyclodextrin.

Once each of the Mixtures were formed, the Mixtures were all combined in the order shown in Table 5 to form about 2 to 3 gallons of the Supplement.

Example 3: Cancer Patient A and Patient B with GI Problems

Patient A (a child) was diagnosed with cancer and began taking the Supplement as a drink, along with chemo therapy and a healthy diet. Six months after beginning this product and his treatments his doctors were astonished. His healing and recovery are like nothing they have seen before.

A 37-year old relative of Patient A, Patient B, who had been struggling with gastrointestinal (GI) problems for years decided to try the Supplement product. Before taking the Supplement, Patient B suffered from constipation that had become so bad that Patient B was hospitalized months ago. Patient B had her gallbladder removed just over 3 month ago, and was feeling well until about the 3rd week after surgery when Patient B had trouble whenever she had a meal. Patient B could not eat half a meal without feeling bloated, gassy, nauseous, tired, and with low energy. Doctors prescribed some ineffective laxatives and stool softeners. Patient B was literally bed ridden for days clue to constipation and weakness, Patient B stopped eating meals and was reduced to snacking. That is when Patient B began to take the Supplement drink. The first day Patient B took 1 to 2 ounces and did not notice many effects, but by the second day Patient B was having normal bowel movements and feeling like she was a teen again! Patient B has been taking the Supplement drink three times a day for weeks now and her condition is 100% completely better.

Patient B reports that this Supplement brought her back to a normal life and she is feeling better than she has in years!

Example 4: Patient C and Family have More Energy

Patient C is a 45-year old woman who had been suffering from anemia and had been having minimal sleep. She has children who are all under the age of 16. Patient C and her children have been taking the Supplement for a while now.

Since the start of taking the Supplement drink the children have not become sick. The oldest children report that when they have skip taking the Supplement drink for a day, they find it harder to focus at school, and feel tired.

Since taking the Supplement drink, Patient C has noticed that her iron levels have stayed at normal levels and Patient C has more energy. Patient C and her children have not noticed any negative side effects.

Example 5: Patient D with Celiacs Disease

From the time Patient D was a toddler she had been diagnosed with a rather aggressive case of Celiacs, which has led to a life of various conditions and multiple hospitalizations due to a compromised immune system. Patient D has had two bouts of cancer twice and has had two operations to remove tumors.

During her pregnancy in 2016-2017, Patient D had anemia. When Patient D was tested, her cell count indicated that the cancer had returned. Because of her pregnancy, Ultrasounds were performed showing that the baby was developing a ureteropelvic junction (UPJ) and could possibly have kidney issues. Patient D did not want to perform a lot of additional testing or take drugs that might harm the baby.

Patient D started taking the Supplement drink a little after halfway through her pregnancy and continued for more than a year afterwards. During her C-section the doctors were not able to visibly see any tumors and drew blood for a full screening. Weeks after giving birth, Patient D received multiple ultrasounds and all the tests came back negative including the anemia. The Doctors could no longer find or detect any of the problems they had seen months prior and were stunned. A year later, all of the blood screenings Patient D received were still negative.

Patient D's child was born with hydronephrosis and torticollis. Patient D started giving her child a small amount of the Supplement drink daily. Within 9 months the child went from having drastically different size ureters to being given a clean bill of health from Pediatric Urologist.

Patient D attributes the improved health that she and her child have experienced to this Supplement.

Example 6: Patient E has Lost Weight and has Improved Immune Responses

Patient E took the Supplement daily to see if it would promote a stronger immune system, overall health, and potentially would promote weight loss in terms of fat reduction.

Patient E began testing this supplement several months ago with several friends who also wanted to see what anecdotal evidence they could find. Patient E and several others all experienced very similar outcomes.

Patient E observed noticeable benefits the first day he took the Supplement. His hunger cravings were substantially lessened. Typically, Patient E could not go more than 3 hours without food. Patient E took 3 shots a day that consisted of 25 ml per dose. After a couple days Patient E started to feel higher energy levels and even seemed to have a clearer thought process. This product also seemed to regulate his GI track in a positive way. Recently over the last 6 months Patient E has just been doing 1 shot a day for health maintenance purposes.

After about 30 days of using this supplement, Patient E began to lose some body fat. Patient E is a weight lifter so this was a welcome sight when looking in the mirror. Patient E dropped about 12 lbs over 3 months. Patient E consumed plenty of protein to maintain muscle mass, and suspects that little higher protein consumption with the Supplement may enhance its benefits.

Patient E observed another intriguing benefit—he rarely gets sick anymore. While everyone around me is getting the seasonal flu and colds, Patient E either does not get these diseases, or he gets a very mild version of them. While everyone else is in bed sick, Patient E is still going about his usual activities. Patient E reports that this never used to be the case before he started taking the Supplement.

The other people who took this for several months all reported the same thing.

All patents and publications referenced or mentioned herein are indicative of the levels of skill of those skilled in the art to which the invention pertains, and each such referenced patent or publication is hereby specifically incorporated by reference to the same extent as if it had been incorporated by reference in its entirety individually or set forth herein in its entirety. Applicants reserve the right to physically incorporate into this specification any and all materials and information from any such cited patents or publications.

The following statements are intended to describe and summarize various aspects of the invention according to the foregoing description in the specification.

Statements:

1. A composition comprising at least four of the following components: an amino acid blend, one or more fulvic-humic acids, one or more multi-minerals, glycerin, one or more phosphatidylinositols, one or more sesquiterpene alkaloids, one or more terpenes, one or more medium-chain triglycerides (MCTs), coconut oil, one or more (e.g. powdered or shredded) whole plants, one or more (e.g., powdered) plant seeds, one or more (e.g.

powdered or shredded) mushrooms, one or more (e.g. powdered or shredded) seaweeds, one or more (e.g. powdered or shredded) kelp, one or more (e.g. powdered or shredded) flavoring agents.

2. The composition of statement 1, comprising at least five, or at least of six, or at least seven, or at least eight, or at least nine, or at least ten, or at least eleven, or at least twelve of the following components: an amino acid blend, one or more Fulvic-humic acids, one or more multi-minerals, glycerin, one or more phosphatidylinositols, one or more sesquiterpene alkaloids, one or more terpenes, one or more medium-chain triglycerides (MCTs), coconut oil, one or more (e.g. powdered or shredded) whole plants, one or more plant seeds, one or more (e.g. powdered or shredded) mushrooms, one or more (e.g. powdered or shredded) seaweeds, one or more (e.g. powdered or shredded) kelp, one or more (e.g. powdered or shredded) flavoring agents.

3. The composition of statement 1 or 2, wherein the amino acid blend comprises at least five, or at least six, or at least seven, or at least eight, or at least nine, or at least ten, or at least eleven, or at least twelve, or at least thirteen, or at least fourteen, or at least fifteen, or at least sixteen, or at least seventeen, or at least eighteen of the following: alanine, arginine, aspartic acid, cysteine, cystine, glutamic acid, glycine, histidine, isoleucine, lysine, leucine, methionine, phenylalanine, serine, proline, threonine, tryptophan, tyrosine, and/or valine.

4. The composition of statement 1, 2, or 3, wherein a single serving each component of the amino acid blend can separately range from about 1 µg/Kg to about 15 mg/Kg, or from about 0.5 mg/Kg to about 14 mg/Kg, or from about 1 mg/Kg to about 13 mg/Kg, or any intervening range therein.

5. The composition of statement 1-3, or 4, wherein the fulvic-humic acids comprise humic acids, fulvic acids, and humin.

6. The composition of statement 1-4, or 5, wherein a single serving of fulvic-humic acids ranges from about 1 mg/Kg to about 50 mg/Kg, or from about 5 mg/Kg to about 40 mg/Kg, or from about 10 mg/Kg to about 30 mg/Kg. In many cases humic/fulvic acid content can be about 20 mg/Kg per serving, or any intervening range therein.

7. The composition of statement 1-5, or 6, wherein a single serving of fulvic-humic acids from Vital Earth (Fulvic Mineral Complex Ionic Mineral Supplement) is about 0.5 to about 2 fluid ounces.

8. The composition of statement 1-6, or 7, wherein the one or more multi-minerals include one or more salts of antimony, barium, beryllium, bismuth, boron, bromine, cadmium, calcium, cerium, cesium, chloride, chromium, cobalt, copper, dysprosium, erbium, europium, fluorine, gadolinium, gallium, germanium, gold, hafnium, holmium, indium, iodine, iridium, iron, lanthanum, lithium, lutetium, magnesium, manganese, molybdenum, neodymium, nickel, niobium, osmium, palladium, phosphorous, platinum, potassium, praseodymium, rhenium, rhodium, rubidium, ruthenium, samarium, scandium, selenium, silicon, silver, sodium, strontium, sulfur, tantalum, tellurium, terbium, thulium, thorium, tin, titanium, tungsten, vanadium, ytterbium, yttrium, zinc, zirconium, or any combination thereof.

9. The composition of statement 1-7, or 8, wherein the one or more salts comprise cations or anions in combination with corresponding gegenions.

10. The composition of statement 9, wherein salts of mineral cations comprise halogen, sulfate, nitrate, and phosphate anions.

11. The composition of statement 9, wherein salts of mineral anions comprise oxygenated forms of transition metals and non-metallic elements (Groups III-VII of the Periodic Chart), alkaline and alkaline earth metal salts.

12. The composition of statement 1-10, or 11, wherein a single serving of each of minerals ranges from about 0.01 µg/Kg to about 100 mg/Kg, or from about 0.1 ng/Kg to about 50 mg/Kg, or from about 1 µg/Kg to about 40 mg/Kg, or from about 5 µg/Kg to about 30 mg/Kg, or from about 10 µg/Kg to about 30 mg/Kg, or from about 1 µg/Kg to about 25 mg/Kg, or any intervening range therein.

13. The composition of statement 1-11, or 12, wherein glycerin is a vegetable glycerin.

14. The composition of statement 1-12, or 13, wherein a single serving of glycerin is about 0.1 mg/Kg to about 10 mg/Kg, or from about 10 mg/Kg to about 80 mg/Kg, or from about 20 mg/Kg to about 60 mg/Kg. In many cases the glycerin content can be about 45 mg/Kg, or any intervening range therein.

15. The composition of statement 1-13, or 14, wherein phosphatidylinositol comprises one or two phosphates, 1-6 fatty acids, and 1-4 phosphoinositol sugars.

16. The composition of statement 1-14, or 15, wherein a single serving of the phosphatidylinositol is about 0.1 mg/Kg to about 10 mg/Kg, or from about 0.2 mg/Kg to about 5 mg/Kg, or from about 0.3 mg/Kg to about 2 mg/Kg, or any intervening range therein.

17. The composition of statement 1-15, or 16, wherein the terpenes or sesquiterpenes comprise at least one, or at least two, or at least three, or at least four, or at least five, or at least six, or at least seven, or at least eight, or at least nine, or at least ten of the following: alpha-humulene, alpha-phellandrene, alpha-pinene, alpha-terpinene, alpha-terpinolene, beta-myrcene, beta-pinene, camphene, cis-ocimene, delta-3 carene, limonene, or any combinations thereof.

18. The composition of statement 1-16, or 17, wherein the terpenes or sesquiterpenes comprise one or more sesquiterpene alkaloid compound.

19. The composition of statement 1-17, or 18, wherein the terpenes or sesquiterpenes comprise huperzine A, with the following structure:

20. The composition of statement 1-18, or 19, wherein a single serving of terpenes and/or sesquiterpenes is about 0.01 µg/Kg to about 100 mg/Kg, about 0.05 µg/Kg to about 50 mg/Kg, or about 0.1 µg/Kg to about 40 mg/Kg, or any intervening range therein.

21. The composition of statement 1-19, or 20, wherein each of the middle chain triglycerides (MCTs) comprise a glycerol moiety, and $C_6$, $C_8$, $C_{10}$ and/or $C_{12}$ fatty acids.

22. The composition of statement 1-20, or 21, wherein about 0% to 3% of the middle chain triglycerides comprise $C_6$ fatty acids.
23. The composition of statement 1-21, or 22, wherein about 50% to 100% of the middle chain triglycerides comprise $C_8$ fatty acids.
24. The composition of statement 1-22, or 23, wherein about 15% to 60% of the middle chain triglycerides comprise $C_{10}$ fatty acids.
25. The composition of statement 1-23, or 24, wherein about 0% to 3% of the middle chain triglycerides comprise $C_{12}$ fatty acids.
26. The composition of statement 1-24, or 25, wherein about fatty acids in the middle chain triglycerides are $C_8$ and $C_{10}$ fatty acids in ratios of about from 1:3 to 3:1.
27. The composition of statement 1-25, or 26, wherein a single serving of the middle chain triglycerides is about 0.01 mg/Kg to about 500 mg/Kg, about 0.05 mg/Kg to about 300 mg/Kg, or about 0.1 mg/Kg to about 200 mg/Kg, or any intervening range therein.
28. The composition of statement 1-26, or 27, wherein the middle chain triglycerides comprise caprylic acid.
29. The composition of statement 1-27, or 28, wherein the middle chain triglycerides comprise caprylic acid and a single serving of caprylic acid is about 1 mg/Kg to about 100 mg/Kg, or from about 10 mg/Kg to about 80 mg/Kg, or from about 10 mg/Kg to about 60 mg/Kg, or any intervening range therein.
30. The composition of statement 1-28, or 29, wherein the middle chain triglycerides comprise caprylic acid and a single serving of caprylic acid is about 1,000 to 3,000 milligrams per day.
31. The composition of statement 1-29, or 30, comprising coconut oil wherein a single serving of coconut oil is about 10 mg/Kg to about 100 mg/Kg, or from about 20 mg/Kg to about 80 mg/Kg, or from about 25 mg/Kg to about 60 mg/Kg, or any intervening range therein.
32. The composition of statement 1-30, or 31, wherein the one or more (e.g. powdered or shredded) whole plants comprise *Astragalus*, fenugreek, monk fruit, and combinations thereof.
33. The composition of statement 1-31, or 32, wherein the one or more (e.g. powdered or shredded) whole plants comprises *Astragalus* of species *Astragalus membraneus*.
34. The composition of statement 1-32, or 33, wherein a single serving is about 1 mg/Kg to about 70 mg/Kg, or from about 3 mg/Kg to about 60 mg/Kg, or from about 5 mg/Kg to about 55 mg/Kg, or any intervening range therein.
35. The composition of statement 1-33, or 34, wherein the one or more (e.g. powdered or shredded) whole plants comprises fenugreek of the family Fabaceae.
36. The composition of statement 1-34, or 35, wherein a single serving of fenugreek is about 0.1 mg/Kg to about 70 mg/Kg, or from about 0.5 mg/Kg to about 60 mg/Kg, or from about 1 mg/Kg to about 55 mg/Kg, or any intervening range therein.
37. The composition of statement 1-35, or 36, wherein the one or more (e.g. powdered or shredded) whole plants comprises monk fruit of species *Siraitia grosvenorii*.
38. The composition of statement 1-36, or 37, wherein a single serving of monk fruit is about 0.1 grams to 40 grams, or about 0.2 to 30 grams, or about 0.3 to 20 grams, or about 0.5 to 20 grams, or any intervening range therein.
39. The composition of statement 1-37, or 38, wherein the plant seeds comprise black seeds, chia seeds, flax seeds, raw pepita seeds, Goji berries, and combinations thereof.
40. The composition of statement 1-38, or 39, wherein the plant seeds comprise black seeds of species *Nigella sativa*.
41. The composition of statement 1-39, or 40, wherein a single serving of black seeds is about 0.001 grams to 40 grams, or about 0.002 to 10 grams, or about 0.003 to 2 grams, or about 0.003 to 1 grams, or any intervening range therein.
42. The composition of statement 1-40, or 41, wherein the plant seeds comprise chia seeds of species *Salvia hispanica*.
43. The composition of statement 1-41, or 42, wherein a single serving of chia seeds is about 0.1 grams to 50 grams, or about 1 to 40 grams, or about 5 to 35 grams, or about 10 to 35 grams, or about 15 to 25 grams, or any intervening range therein.
44. The composition of statement 1-42, or 43, wherein the plant seeds comprise flax seeds of species *Linum usitatissimum*.
45. The composition of statement 1-43, or 44, wherein a single serving of flaxseeds is about 1 grams to 100 grams, or about 3 to 75 grams, or about 5 to 60 grams, or about 10 to 50 grams, or about 20 to 45 grams, or any intervening range therein.
46. The composition of statement 1-44, or 45, wherein the plant seeds comprise raw pepita seeds.
47. The composition of statement 1-45, or 46, wherein a single serving of pepita seeds is about 1 grams to 150 grams, or about 5 to 100 grams, or about 10 to 75 grams, or about 15 to 50 grams, or about 20 to 45 grams, or any intervening range therein.
48. The composition of statement 1-46, or 47, wherein the plant seeds comprise Goji berry or wolfberry is of species *Lycium barbarum* or *Lycium chinense*.
49. The composition of statement 1-47, or 48, wherein a single serving of Goji berry or wolfberry is about 50 to 1000 mg, or about 75 to 500 mg, or about 5 to 125 grams, or about 10 to 100 grams, or about 20 to 90 grams, or about 30 to 75 grams, or any intervening range therein.
50. The composition of statement 1-48, or 49, wherein the mushrooms comprise Brazillian Blazei (*Agaricus blazei*), Caterpillar Mushroom (*Cordyceps sinensis*), Agarikon (*Fomitopsis officinalis*), Turkey Tail (*Coriolus versicolor*), Enoki (*Flammulina velutipes*), reishi (*Ganoderma lucidum*), Artist Conk (*Ganoderma applanatum*), Maitake (*Grifola frondosa*), Lion's Mane (*Hericium erinaceus*), Chaga (*Inonotus obliquus*), Shiitake (*Lentinula edodes*), Birch Polypore (*Piptoporus betulinus*), Mesimakobu (*Phellinus linteus*), Zhu ling (*Polyporus umbellatus*), Fuling (*Poria cocos*), or a combination thereof.
51. The composition of statement 1-49, or 50, wherein the mushrooms comprise Brazillian Blazei (*Agaricus blazei*) and wherein a single serving of Brazillian Blazei (*Agaricus blazei*) is about 0.1 grams to 40 grams, or about 0.5 to 25 grams, or about 1 to 15 grams, or about 1.5 to 10 grams, or about 1.5 to 7 grams, or any intervening range therein.
52. The composition of statement 1-50, or 51, wherein the mushrooms comprise Caterpillar Mushroom (*Cordyceps sinensis*) and wherein a single serving of Caterpillar Mushroom (*Cordyceps sinensis*) about 0.01 grams to 20 grams, or about 0.05 to 15 grams, or about 0.1 to 10 grams, or about 0.5 to 5 grams, or about 1 to 3 grams, or any intervening range therein.

53. The composition of statement 1-51, or 52, wherein the mushrooms comprise Agarikon (*Fomitopsis officinalis*) and wherein a single serving of Agarikon (*Fomitopsis officinalis*) is about 0.1-20 gm./day, or about 0.25-10 gm./day, or about 0.5-5 gm./day, or any intervening range therein 54. The composition of statement 1-52, or 53, wherein the mushrooms comprise Turkey Tail (*Coriolus versicolor*) and wherein a single serving of Turkey Tail (*Coriolus versicolor*) is about 0.01 grams to 20 grams, or about 0.5 to 15 grams, or about 1 to 12 grams, or about 3 to 10 grams, or about 5 to 10 grams, or any intervening range therein.

55. The composition of statement 1-53, or 54, wherein the mushrooms comprise Enoki (*Flammulina velutipes*) and wherein a single serving of Enoki (*Flammulina velutipes*) is about 0.1 grams to 200 grams, or about 0.5 to 150 grams, or about 1 to 100 grams, or about 1 to 50 grams, or about 2 to 10 grams, or any intervening range therein.

56. The composition of statement 1-54, or 55, wherein the mushrooms comprise reishi (*Ganoderma lucidum*) and wherein a single serving of reishi (*Ganoderma lucidum*) is about 0.5 to 100 grams, or about 1 to 50 grams, or about 2 to 20 grams, or about 3 to 10 grams, or any intervening range therein.

57. The composition of statement 1-55, or 56, wherein the mushrooms comprise Artist Conk (*Ganoderma applanatum*) and wherein a single serving of Artist Conk (*Ganoderma applanatum*) is about 0.5 to 100 grams, or about 1 to 50 grams, or about 2 to 20 grams, or about 3 to 10 grams, or any intervening range therein.

58. The composition of statement 1-56, or 57, wherein the mushrooms comprise Maitake (*Grifola frondosa*) and wherein a single serving of Maitake (*Grifola frondosa*) is about 0.01 grams to 20 grams, or about 0.05 to 15 grams, or about 0.1 to 10 grams, or about 0.3 to 7 grams, or about 0.4 to 5 grams, or any intervening range therein.

59. The composition of statement 1-57, or 58, wherein the mushrooms comprise Lion's Mane (*Hericium erinaceus*) and wherein a single serving of Lion's Mane (*Hericium erinaceus*) is about 0.01 grams to 20 grams, or about 0.05 to 15 grams, or about 0.1 to 10 grams, or about 0.3 to 7 grams, or about 0.4 to 5 grams, or any intervening range therein.

60. The composition of statement 1-58, or 59, wherein the mushrooms comprise Chaga (*Inonotus obliquus*) and wherein a single serving of Chaga (*Inonotus obliquus*) is about 0.01 grams to 20 grams, or about 0.05 to 15 grams, or about 0.1 to 10 grams, or about 0.3 to 7 grams, or about 0.3 to 5 grams, or any intervening range therein.

61. The composition of statement 1-59, or 60, wherein the mushrooms comprise Shiitake (*Lentinula edodes*) and wherein a single serving of Shiitake (*Lentinula edodes*) is about 0.1 grams to 30 grams, or about 0.5 to 20 grams, or about 1 to 15 grams, or about 2 to 12 grams, or about 4 to 11 grams, or any intervening range therein.

62. The composition of statement 1-60, or 61, wherein the mushrooms comprise Birch Polypore (*Piptoporus betulinus*) and wherein a single serving of Birch Polypore (*Piptoporus betulinus*) is about 0.1 grams to 30 grams, or about 0.5 to 20 grams, or about 1 to 15 grams, or about 2 to 12 grams, or about 4 to 11 grams, or any intervening range therein.

63. The composition of statement 1-61, or 62, wherein the mushrooms comprise Mesimakobu (*Phellinus linteus*) and wherein a single serving of Mesimakobu (*Phellinus linteus*) is about 1 grams to 100 grams, or about 2 to 75 grams, or about 2 to 50 grams, or about 2 to 25 grams, or about 3 to 15 grams, or any intervening range therein.

64. The composition of statement 1-62, or 63, wherein the mushrooms comprise Zhu ling (*Polyporus umbellatus*) and wherein a single serving of Zhu ling (*Polyporus umbellatus*) is about 0.01 grams to 20 grams, or about 0.05 to 15 grams, or about 0.1 to 10 grams, or about 0.3 to 7 grams, or about 0.3 to 5 grams, or any intervening range therein.

65. The composition of statement 1-63, or 64, wherein the mushrooms comprise Fuling (*Poria cocos*) and wherein a single serving of Fuling (*Poria cocos*) is about 0.5 to 100 grams, or about 1 to 50 grams, or about 2 to 25 grams, or about 5 to 20 grams, or any intervening range therein.

66. The composition of statement 1-64, or 65, wherein a single serving of each of the mushrooms is about 10 to 500 mg, or about 20 to 400 mg, or about 30 to 300 mg, or about 50 to 200 mg.

67. The composition of statement 1-65, or 66, wherein the one or more (e.g. powdered or shredded) seaweeds or kelp comprise *Spirulina* powder, blue green algae, *Chlorella*, and combinations thereof.

68. The composition of statement 1-66, or 67, wherein a single daily serving of each seaweed or kelp is about 0.5 to 100 grams, or about 1 to 50 grams, or about 2 to 25 grams, or about 5 to 20 grams, or any intervening range therein.

69. The composition of statement 1-67, or 68, wherein a single serving of each seaweed or kelp is about 1 to 200 mg, or about 10 to 150 mg, or about 30 to 100 mg, or any intervening range therein.

70. The composition of statement 1-68, or 69, comprising flavorings that are natural or artificial.

71. The composition of statement 1-69, or 70, comprising flavorings selected from strawberry, plum, banana, blueberry, cherry, cinnamon, coconut, coffee, chocolate (e.g., dark chocolate), raspberry, grape, green apple, lemon, mango, menthol, mint, mojito, orange, peach, pear, pineapple, pomegranate, root beer, tobacco, vanilla, watermelon, or combinations thereof.

72. The composition of statement 1-70, or 71, comprising at least one freshness preservation agent.

73. The composition of statement 1-71, or 72, comprising at least one freshness preservation agent selected from potassium benzoate, β-cyclodextrin, γ-cyclodextrin, or a combination thereof.

74. The composition of statement 1-72, or 73, comprising at least one freshness preservation agent at about 0.01% by weight to about 5% by weight of the supplement food weight.

75. A method comprising administering the composition of statement 1-73 or 74 to an animal.

76. The method of statement 75, wherein the animal is a human, a domesticated animal, or a zoo animal.

77. The method of statement 75 or 76, wherein the composition reduces the incidence or severity of disease compared to an animal of the same species that does not receive the composition.

78. The method of statement 75, 76, or 77, comprising administering the composition to the animal for 1 week to 52 weeks, for 2 weeks to 104 weeks, or for indefinitely.

79. A composition comprising:
- amino acid powder: alanine, arginine, aspartic acid, cysteine or cystine, glutamic acid, glycine, histidine, isoleucine, lysine, leucine, methionine, phenylalanine, serine, proline, threonine, tryptophan, tyrosine, and valine;
- fulvic-humic acids;
- minerals;
- glycerin;
- phosphatidylinositol;
- (±)-huperzine A;
- caprylic Acid (octanoic acid);
- medium chain triglycerides;
- coconut oil;
- *Astragalus* plant matter, fenugreek plant matter, monk fruit plant matter;
- liquid or powdered black seeds, liquid or powdered chia seeds, liquid or powdered flax seeds, liquid or powdered raw pepita seeds, liquid or powdered goji berries;
- terpene powder: alpha-humulene, alpha-phellandrene, alpha-pinene, alpha-terpinene, alpha-terpinolene, beta-myrcene, beta-pinene, camphene, cis-ocimene, delta-3 carene, limonene;
- liquid or powdered mushroom mixture: Brazillian Blazei (*Agaricus blazei*), Caterpillar Mushroom (*Cordyceps sinensis*), Agarikon (*Fomitopsis officinalis*), Turkey Tail (*Coriolus versicolor*), Enoki (*Flammulina velutipes*), reishi (*Ganoderma lucidum*), Artist Conk (*Ganoderma applanatum*), Maitake (*Grifola frondosa*), Lion's Mane (*Hericium erinaceus*), Chaga (*Inonotus obliquus*), Shiitake (*Lentinula edodes*), Birch Polypore (*Piptoporus betulinus*), Mesimakobu (*Phellinus linteus*), Zhu ling (*Polyporus umbellatus*), Fuling (*Poria cocos*);
- liquid or powder seaweed and/or kelp: *Spirulina*, blue green algae, *Chlorella*; and
- potassium benzoate.

80. The composition of claim 78, further comprising one or more of the following flavoring agents: strawberry, plum, banana, blueberry, cherry, cinnamon, coconut, coffee, chocolate (e.g., dark chocolate), raspberry, grape, green apple, lemon, mango, menthol, mint, mojito, orange, peach, pear, pineapple, pomegranate, root beer, tobacco, vanilla, watermelon.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and the methods and processes are not necessarily restricted to the orders of steps indicated herein or in the claims.

As used herein and in the appended claims, the singular forms "a," "an," and "the" include plural reference unless the context clearly dictates otherwise. Thus, for example, a reference to "a compound," "a cell," "a nutrient" or "an amino acid" includes a plurality of such compounds, cells, nutrients or amino acids (for example, a solution of cells, nutrients, or amino acids, a suspension of cells, or a series of compound, nutrient, or amino acid preparations), and so forth. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are within the scope of this invention as defined by the appended claims and statements of the invention.

What is claimed is:

1. A composition formulated for human consumption, comprising an amino acid blend, fulvic acids, minerals selected from salts of calcium, potassium, sodium, or a combination thereof, a phosphatidylinositol, one or more terpenes, medium-chain triglycerides, powdered or shredded fenugreek seeds, monk fruit, blue green algae, a powdered or shredded mushrooms comprising chaga (*Inonotus obliquus*), Brazilian Blazei (*Agaricus blazei*), Caterpillar Mushroom (*Cordyceps sinensis*), Lion's Mane (*Hericium erinaceus*), reishi (*Ganoderma lucidum*), and Turkey Tail (*Coriolus versicolor*), and flavorings;
wherein the amino acid blend comprises alanine at about 5.8 mg/kg Body Weight, arginine, at about 8.18 mg/kg Body Weight, aspartic acid at about 1.092 mg/kg Body Weight, cysteine at about 2.88 mg/kg Body Weight, glutamic acid at about 2.065 mg/kg Body Weight, histidine, at about 2.7 mg/kg Body Weight, isoleucine at about 7 mg/kg Body Weight, lysine at about 8 mg/kg Body Weight, leucine at about 10.91 mg/kg Body Weight, methionine at about 2.76 mg/kg Body Weight, ornithine at about 0.06 mg/kg Body Weight, phenylalanine at about 0.01 mg/kg Body Weight, serine at about 11.2 mg/kg Body Weight, proline at about 7.32 mg/kg Body Weight, threonine at about 5.7 mg/kg Body Weight, tyrosine at about 4.92 mg/kg Body Weight, and valine at about 7.22 mg/kg Body Weight.

2. The composition of claim 1, wherein the phosphatidylinositol comprises one or two phosphates, 1-6 fatty acids, and 1-4 phosphoinositol sugars.

3. The composition of claim 1, wherein the terpenes comprise at least one of alpha-humulene, alpha-phellandrene, alpha-pinene, alpha-terpinene, alpha-terpinolene, beta-myrcene, beta-pinene, camphene, cis-ocimene, delta-3 carene, limonene, or any combinations thereof.

4. The composition of claim 1, wherein the terpenes comprise one or more sesquiterpene alkaloid compound.

5. The composition of claim 1, wherein the terpenes comprise huperzine A, with the following structure:

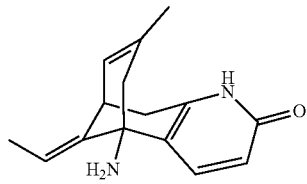

6. The composition of claim 1, wherein each of the middle chain triglyceride comprises a glycerol moiety, and one or more $C_6$, $C_8$, $C_{10}$ or $C_{12}$ fatty acids.

7. The composition of claim 1, wherein the middle chain triglycerides comprises caprylic acid.

8. The composition of claim 1, further comprising black seeds, chia seeds, flax seeds, raw pepita seeds, Goji berries, wolfberries, or any combination thereof.

9. The composition of claim 1, wherein the mushrooms further comprise Agarikon (*Fomitopsis officinalis*), Enoki (*Flammulina velutipes*), Artist Conk (*Ganoderma applanatum*), Maitake (*Grifola frondosa*), Shiitake (*Lentinula edodes*), Birch Polypore (*Piptoporus betulinus*), Mesimakobu (*Phellinus linteus*), Zhu ling (*Polyporus umbellatus*), Fuling (*Poria cocos*), or any combination thereof.

10. The composition of claim 1, comprising flavorings that are natural flavorings.

11. The composition of claim 1, comprising at least one freshness preservation agent.

12. The composition of claim 1, further comprising at least one freshness preservation agent selected from potassium benzoate, β-cyclodextrin, γ-cyclodextrin, or a combination thereof.

13. A method comprising administering the composition of claim 1 to a human.

14. The method of claim 13, comprising administering 1 to 5 servings of the composition to a human per day.

15. The method of claim 13, wherein the composition reduces the incidence or severity of disease compared to a human who does not receive the composition.

16. The composition of claim 1, further comprising hemp protein, pea protein, or a combination thereof.

17. A composition formulated for human consumption, comprising an amino acid blend;
fulvic acids; minerals selected from salts of calcium, potassium, sodium, or a combination thereof; hemp protein; pea protein; blue green algae; powdered or shredded whole fenugreek seeds; powdered or shredded monk fruit; powdered or shredded pepita plant seeds; powdered or shredded mushrooms comprising Chaga (*Inonotus obliquus*), Brazilian Blazei (*Agaricus blazei*), Caterpillar Mushroom (*Cordyceps sinensis*), Lion's Mane (*Hericium erinaceus*), reishi (*Ganoderma lucidum*), and Turkey Tail (*Coriolus versicolor*); and flavorings;
wherein the amino acid blend comprises alanine at about 5.8 mg/kg Body Weight, arginine, at about 8.18 mg/kg Body Weight, aspartic acid at about 1.092 mg/kg Body Weight, cysteine at about 2.88 mg/kg Body Weight, glutamic acid at about 2.065 mg/kg Body Weight, histidine at about 2.7 mg/kg Body Weight, isoleucine at about 7 mg/kg Body Weight, lysine at about 8 mg/kg Body Weight, leucine at about 10.91 mg/kg Body Weight, methionine at about 2.76 mg/kg Body Weight, ornithine at about 0.06 mg/kg Body Weight, phenylalanine at about 0.01 mg/kg Body Weight, serine at about 11.2 mg/kg Body Weight, proline at about 7.32 mg/kg Body Weight, threonine at about 5.7 mg/kg Body Weight, tyrosine at about 4.92 mg/kg Body Weight, and valine at about 7.22 mg/kg Body Weight.

18. The composition of claim 17, wherein the mushrooms further comprise Agarikon (*Fomitopsis officinalis*), Artist Conk (*Ganoderma applanatum*), Maitake (*Grifola frondosa*), Shiitake (*Lentinula edodes*), Birch Polypore (*Piptoporus betulinus*), Mesimakobu (*Phellinus linteus*), Zhu ling (*Polyporus umbellatus*), Fuling (*Poria cocos*), or any combination thereof.

* * * * *

UNITED STATES PATENT AND TRADEMARK OFFICE
CERTIFICATE OF CORRECTION

| | |
|---|---|
| PATENT NO. | : 11,638,440 B2 |
| APPLICATION NO. | : 16/489352 |
| DATED | : May 2, 2023 |
| INVENTOR(S) | : Carrington et al. |

It is certified that error appears in the above-identified patent and that said Letters Patent is hereby corrected as shown below:

On the Title Page

In Column 2, under "Other Publications", Line 5, delete "Gooole" and insert --Google-- therefor In Column 2, under "Other Publications", Line 5, delete "oon" and insert --on-- therefor In the Claims In Column 36, Line 44, in Claim 1, delete "arginine," and insert --arginine-- therefor In Column 36, Line 48, in Claim 1, delete "histidine," and insert --histidine-- therefor In Column 38, Line 19, in Claim 17, delete "arginine," and insert --arginine-- therefor Signed and Sealed this
Fifth Day of November, 2024

Katherine Kelly Vidal
*Director of the United States Patent and Trademark Office*